(12) United States Patent
Tanabe et al.

(10) Patent No.: US 6,268,918 B1
(45) Date of Patent: *Jul. 31, 2001

(54) THREE-DIMENSIONAL INPUT DEVICE

(75) Inventors: Hideki Tanabe, Ibaraki; Eiichi Ide, Itami; Hiroshi Uchino, Otokuni-Gun; Makoto Miyazaki, Ibaraki; Koichi Kamon, Takatsuki; Toshio Norita, Osaka, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 52 days.

(21) Appl. No.: 09/332,969

(22) Filed: Jun. 15, 1999

(30) Foreign Application Priority Data

Jun. 18, 1998 (JP) .................................................. 10-171204

(51) Int. Cl.[7] ...................................................... G01B 11/24

(52) U.S. Cl. .......................... 356/376; 356/379; 356/386; 356/226; 356/233

(58) Field of Search ..................................... 356/376, 379, 356/386, 226, 233

(56) References Cited

U.S. PATENT DOCUMENTS

| 4,758,093 | * | 7/1988 | Stern et al. | 356/376 |
| 4,794,262 | * | 12/1988 | Sato et al. | 356/376 |
| 5,668,631 | | 9/1997 | Norita et al. | |

* cited by examiner

Primary Examiner—Frank G. Font
Assistant Examiner—Reginald Ratliff
(74) Attorney, Agent, or Firm—McDermott, Will & Emery

(57) ABSTRACT

An apparatus and method for detecting a three-dimensional image. The apparatus includes a projector which projects a reference light on an object; an image sensor which senses an image of the object; and a controller for controlling the projector and the image sensor, wherein the image sensor includes an aperture that restricts the passage of entering light; and an aperture controller for setting an aperture value for the aperture when receiving a two-dimensional image input, and setting an aperture value for the aperture when receiving a three-dimensional image input. The aperture value is set based on the intensity of received reference light. A processing unit determines the position of the object based on a relationship between an illumination direction of the reference light at the determined time center Npeak and an entrance direction of the reference light relative to the target pixel. A flicker detector detects a change frequency in light received by the image sensor, and the controller controls the image sensor to sense frames of an image at a frequency which is a multiple of the detected change frequency.

28 Claims, 21 Drawing Sheets

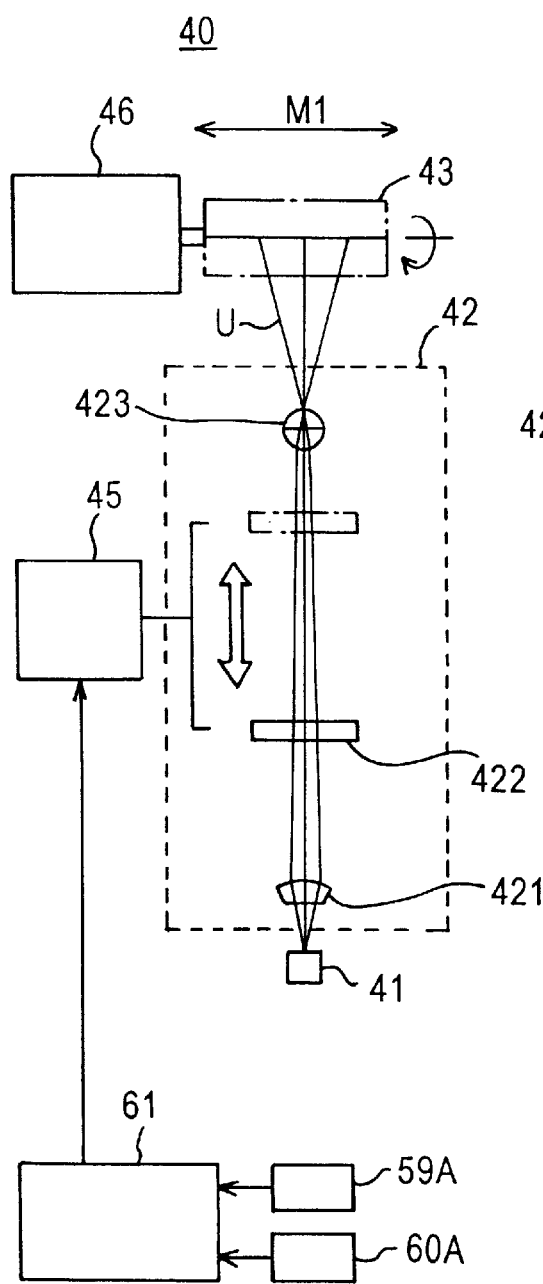
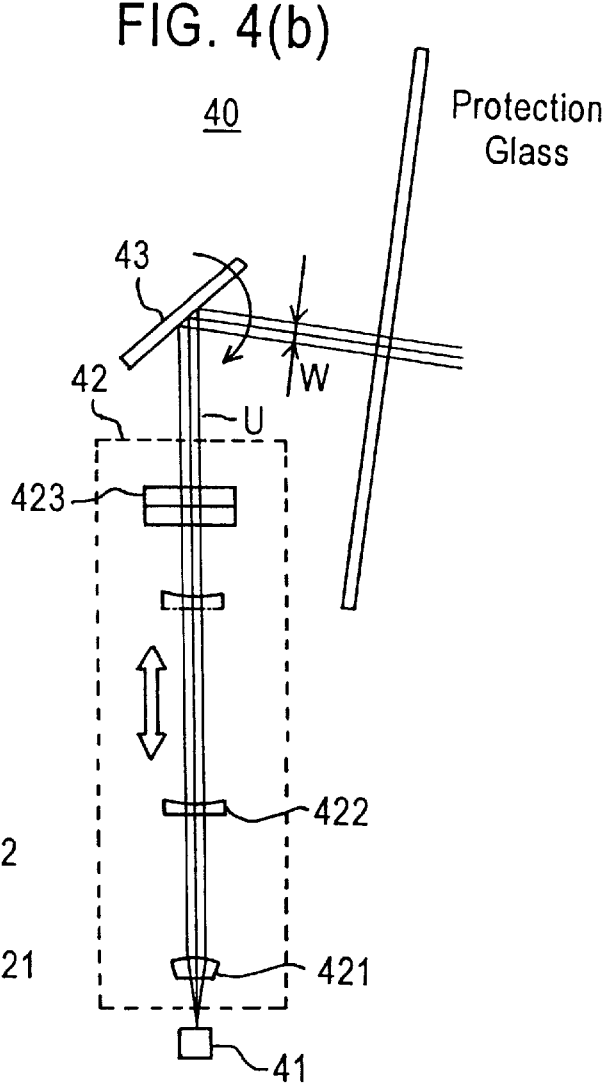
FIG. 4(a)
FIG. 4(b)

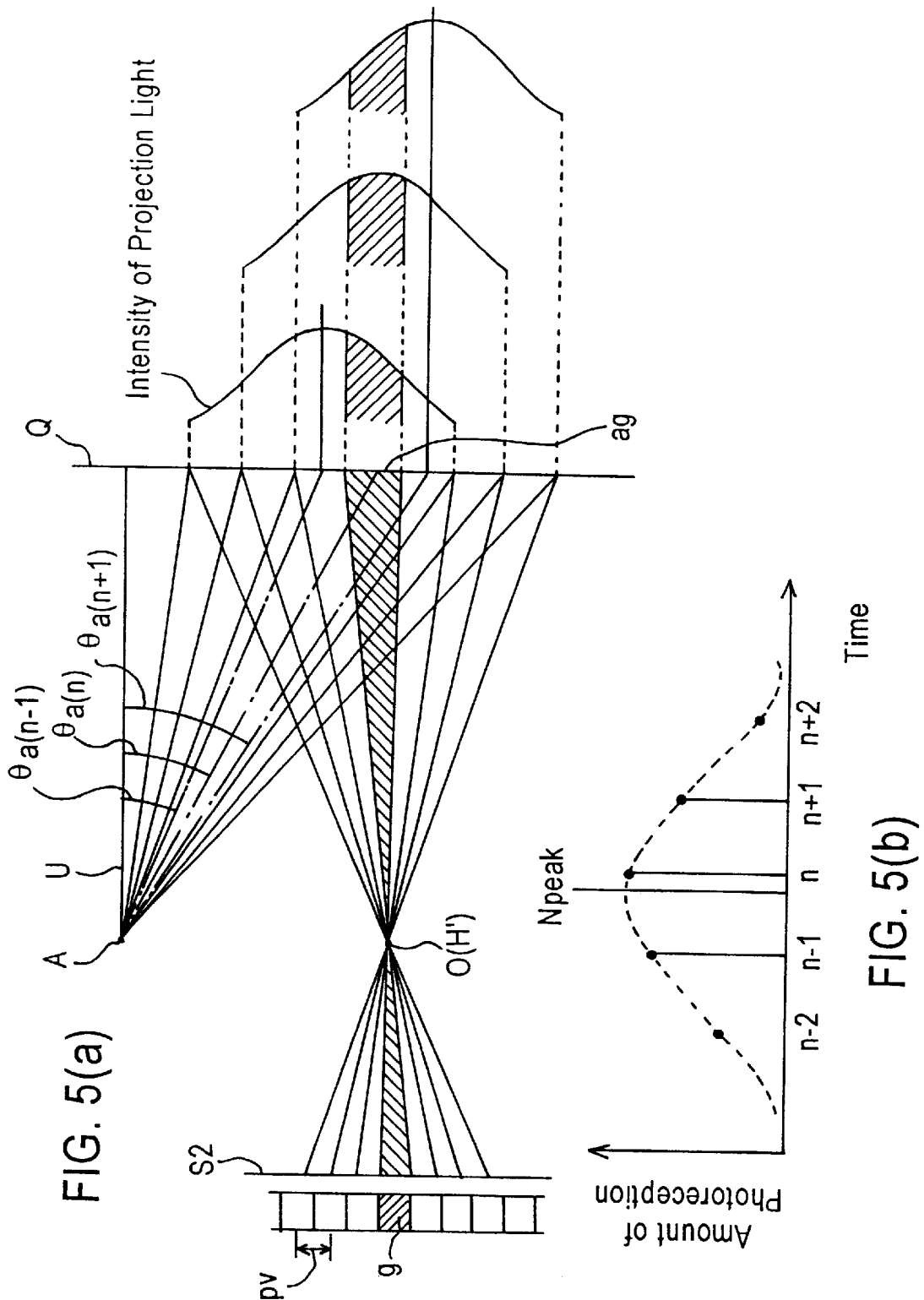

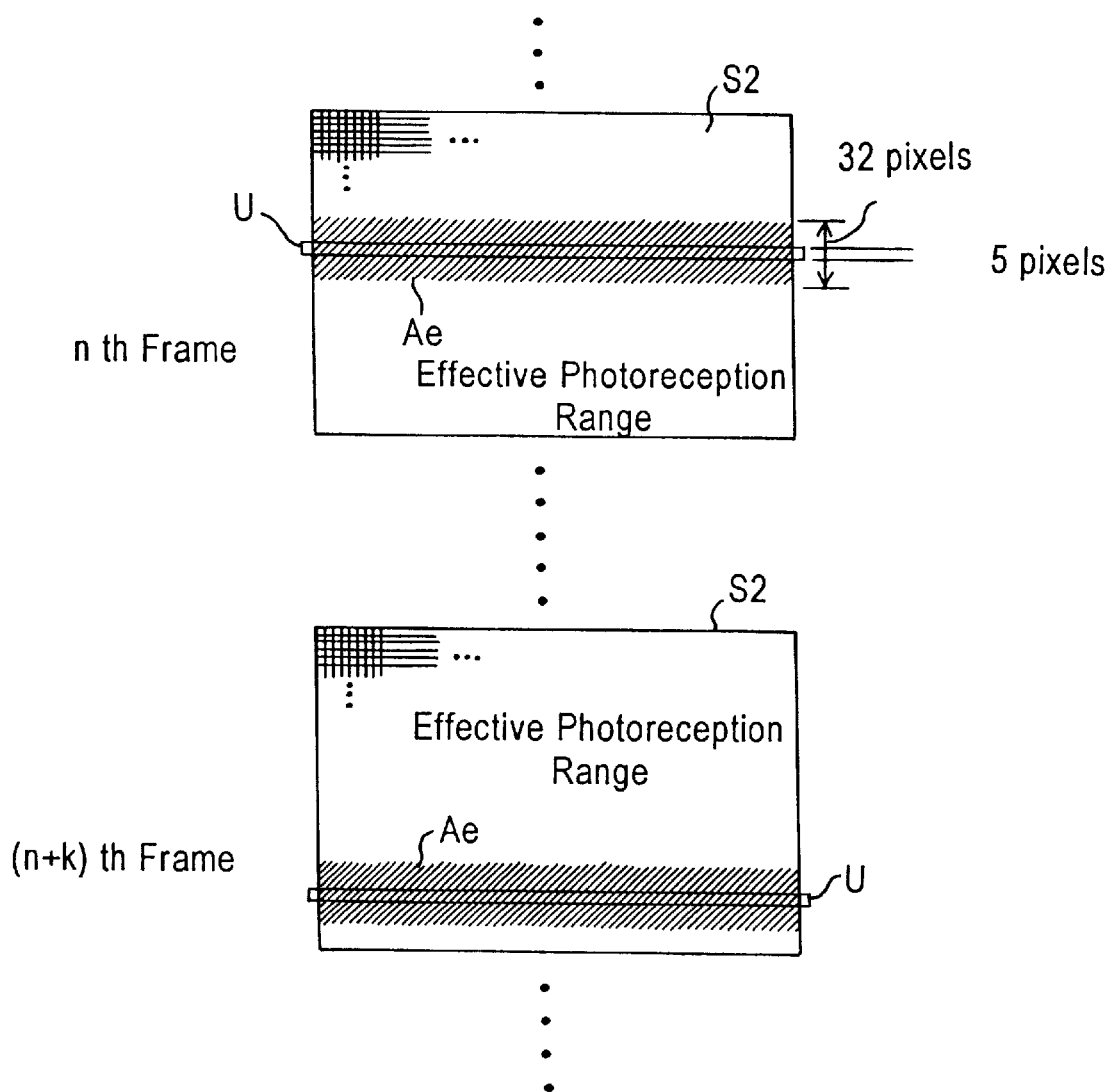

Slit Light

Background Light

Background Light
Slit Light

Photoreception Data

Slit Light

Background Light

Background Light

Slit Light

Photoreception Data ip' = ip

THREE-DIMENSIONAL INPUT DEVICE

BACKGROUND OF THE INVENTION

1. Field of the Invention

The present invention relates to a three-dimensional input device for measuring the shape of an object by projecting a reference light on the object.

2. Description of the Related Art

Non-contact type three-dimensional input devices which are known as rangefinders are used for data input to computer graphics (CG) systems and computer-aided design (CAD) systems, physical (body) measurement, robot visual recognition and the like because these devices are capable of high speed measurement compared to contact-type devices.

The slit projection method (also referred to as "light-section method") is known to be suitable as a measurement method for rangefinders. This method optically scans an object to obtain a distance image (three-dimensional image), and is one type of dynamic measuring method for sensing an object by illumination with a specific reference light. The distance image is a collection of pixels expressing a three-dimensional position at a plurality of parts of an object. In the slit projection method, a slit light having a linear band-like projection beam cross section is used as a reference light.

A two-dimensional color photography function is used in the rangefinder. A photographed two-dimensional image is displayed on a monitor via an internal or external display device, and a user uses the reference information when determining the field angle of the three-dimensional measurement. Two-dimensional photography is accomplished at the same field angle as three-dimensional measurement, and the obtained two-dimensional image is combined with the three-dimensional data and either output or stored as the measurement result. When viewing the two-dimensional image, a user can readily confirm the measured object, and the two-dimensional image may be used for correction or processing of the three-dimensional data.

In a conventional rangefinder, an aperture is not provided in the light-receiving optical path so as to allow as much reference light reflected by an object as possible to enter the photoreceptive surface of the photoelectric converter. Two-dimensional photography is accomplished by automatic exposure control via an electronic shutter, and three-dimensional measurement is accomplished by optimizing the amount of light entering the photoreceptive surface by adjusting the projection intensity of the reference light. A disadvantage of this construction is that in two-dimensional photography the depth of the field cannot be increased, and the aberration produced by the lens cannot be ignored. This disadvantageously produces a small S/N ratio. In three-dimensional measurement, when the projection intensity is reduced, the effect of the background light increases so as to reduce the measurement accuracy.

SUMMARY AND OBJECTS

An object of the present invention is to increase the quality of the output data by setting a suitable exposure and depth of field for two-dimensional photography and three-dimensional measurement, respectively.

To achieve the foregoing and other objects and in accordance with the purpose of the present invention, as embodied and broadly described herein, the apparatus of the this invention comprises a projector which projects a reference light on an object; an image sensor which senses an image of the object and converts the image into electrical signals; and a controller for controlling the projector and the image sensor, wherein when the controller prevents the projector from projecting the reference light, a two-dimensional image input is received by the image sensor and converted into a two-dimensional image electrical signals, and when the controller instructs the projector to project the reference light, a three-dimensional image input is received by the image sensor and converted into a three-dimensional image electrical signals.

In a further aspect of the present invention the apparatus hereof also comprises a processing unit which measures the shape of the object based on the three dimensional image electrical signals.

In yet a further aspect of the present invention the apparatus hereof also comprises an aperture that restricts the passage of entering light; and an aperture controller for independently setting an aperture value for the aperture when receiving a two-dimensional image input, and setting an aperture value for the aperture when receiving a three-dimensional image input.

In a further aspect of the present invention the apparatus hereof also comprises a first light receiving device for two-dimensional image input; a second light receiving device for three-dimensional input; a lens system which receives light from the object, the lens system being common to the first light receiving device and the second light receiving device; and an optical member for distributing the light received by the lens system to the first light receiving device and the second light receiving device, wherein the aperture is disposed within the optical path between the lens system and the optical member.

In a further aspect of the present invention the apparatus hereof wherein the projector projects the reference light in the form of a slit, and the reference light scans the object so as to move one pixel pitch on a surface of the image sensor in a sampling cycle.

In a further aspect of the present invention the apparatus hereof also comprises a memory for storing a plurality of frames of an image, each frame of the plurality of frames having a plurality of lines of an image with a line in common with all other frames of the plurality of frames, and wherein the processing unit determines the time center Npeak of the line in common with all other frames of the plurality of frames.

In yet a further aspect of the present invention the apparatus hereof also comprises a flicker detector which detects a change frequency in light received by the image sensor, and wherein the controller controls the image sensor to sense frames of an image at a frequency which is a multiple of the detected change frequency.

To further achieve the foregoing and other objects of the present invention, as embodied and broadly described herein, the method of the this invention comprises a method of detecting an image in an image detecting device including a projector which projects a reference light on an object, an image sensor which senses an image of the object, and a controller which controls the projector and the image sensor, the method comprising the steps of: sensing a two-dimensional image input by the image sensor; sensing a three-dimensional image based on the reference light; making a three-dimensional measurement; and forming an image based on the two-dimensional image and the three-dimensional image.

In an aspect of the present invention the step of sensing a two-dimensional image further comprises the steps of: setting an aperture value of an aperture through which the received two-dimensional and three-dimensional images pass; and capturing the received two-dimensional image and converting the received two-dimensional image into electrical signals.

In a further aspect of the present invention the method hereof also comprises the steps of: a preliminary measurement; and a second sensing of two-dimensional images, wherein said steps of preliminary measurement and second sensing of two-dimensional images occur after the step of sensing of two-dimensional images and before the step of sensing a three-dimensional image.

In a further aspect of the present invention the step of preliminary measurement further comprises the steps of: opening the an aperture through which the received two-dimensional and three-dimensional images pass; projecting a minimum intensity of the reference light by the projector; setting a provisional aperture value based on a measured value of the light received through the aperture at the minimum intensity of the reference light; projecting a maximum intensity of the reference light by the projector; and setting the provisional aperture value as the aperture value if a measured value of the light received through the aperture at the maximum intensity of the reference light is within a predetermined range.

In a further aspect of the present invention the method hereof also comprise wherein the step of making a three-dimensional measurement further comprises the steps of: setting an aperture value, of an aperture through which the received two-dimensional and three-dimensional images pass, based on the results of the preliminary measurement step; setting a frame cycle of the image sensor based change cycle of background light; setting a scan speed of the image sensor based on the frame cycle of the image sensor; and measuring the distance of an object from the image sensor.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

FIGS. 4(a) and 4(b) show an exemplary embodiment of the projection lens system of the present invention;

FIGS. 5(a) and 5(b) illustrate the principle of the calculation of the three-dimensional position by the measuring system;

FIG. 6 shows an example of the sensor reading range;

DESCRIPTION OF THE PREFERRED EMBODIMENTS

Figure 1:
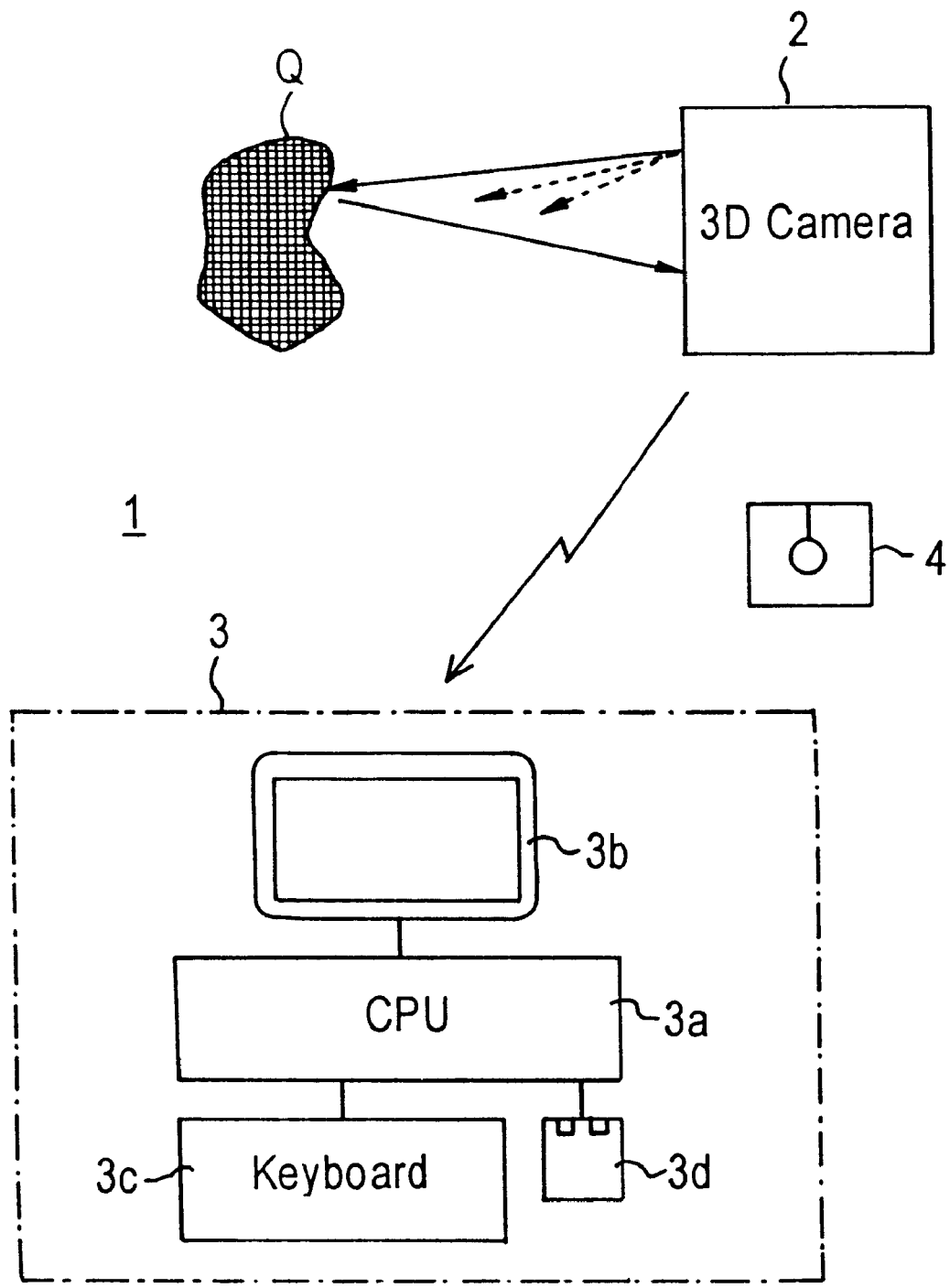
FIG. 1 shows an exemplary embodiment of the measuring system of the present invention.

FIG. 1 shows an exemplary embodiment of a measurement system 1 of the present invention.

Measurement system 1 comprises a three-dimensional camera (rangefinder) 2 for stereoscopic measurement via the slit projection method, and a host 3 for processing the output data from the three-dimensional camera 2.

The three-dimensional camera 2 outputs measurement data specifying the three-dimensional positions of a plurality of sampling points on object Q, and data necessary for calibration and a two-dimensional image showing color information of the object Q. The host 3 executes a calculation process for determining the coordinates of the sampling points using a trigonometric survey method.

The host 3 is a computer system comprising a center processing unit (CPU) 3a, a display 3b, a keyboard 3c, and a mouse 3d. Software for processing the measurement data is included in the CPU 3a. Bi-directional data transfer is possible between the host 3 and the three-dimensional camera 2 both online and offline via a portable recording medium 4. The recording medium 4 may be a magneto-optic disk (MO), minidisk (MD), memory card and the like.

Figure 2A:
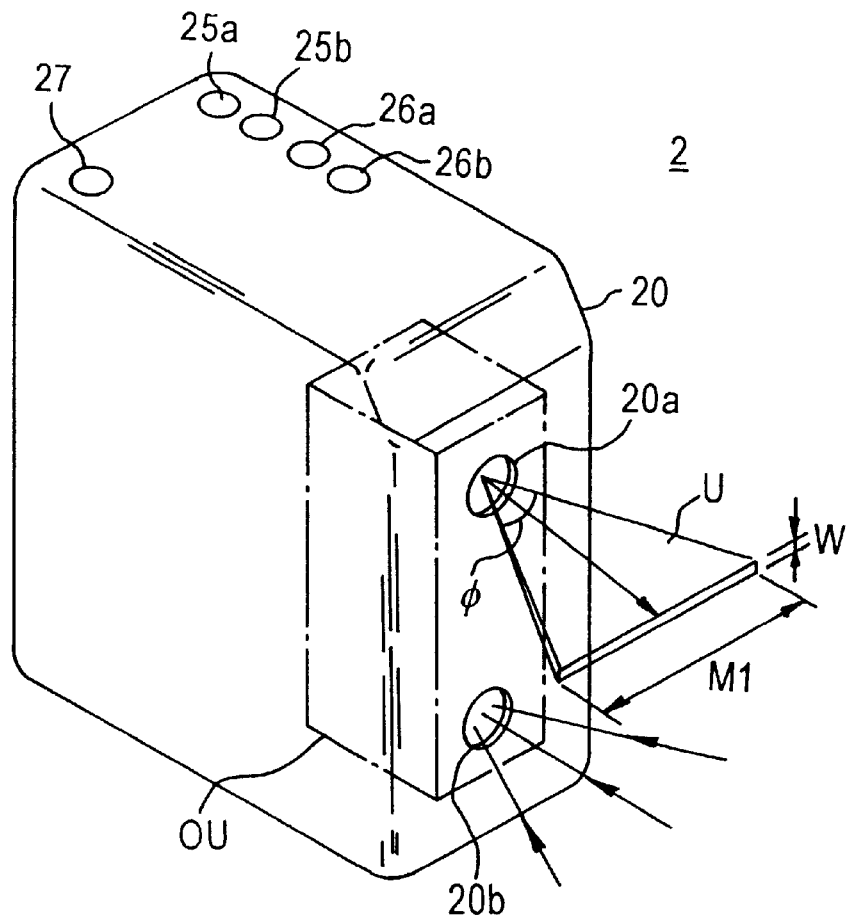
FIGS. 2(a) and 2(b) show an exemplary external view of a three-dimensional camera of the present invention.

FIG. 2 shows an exemplary external view of the three-dimensional camera 2.

A projection window 20a and a light reception window 20b are provided on the front side of a housing 20. The projection window 20a is positioned above the light reception window 20b. The slit light (a band-like laser beam of predetermined width w) U emitted from an internal optical unit OU passes through the projection window 20a toward an object being measured. The angle of radiation φ in the length direction M1 of the slit light U is fixed. A part of the slit light U reflected by the surface of the object passes through the light reception window 20b and enters the optical unit OU. A photoelectric conversion circuit is incorporated in the optical unit OU as a flicker sensor for detecting changes in background light. Background light is light other than the slit light U illuminating the object. The optical unit OU is provided with a dual axis adjustment mechanism for optimizing the relative relationship between the projection light axis and the reception light axis.

Figure 2B:
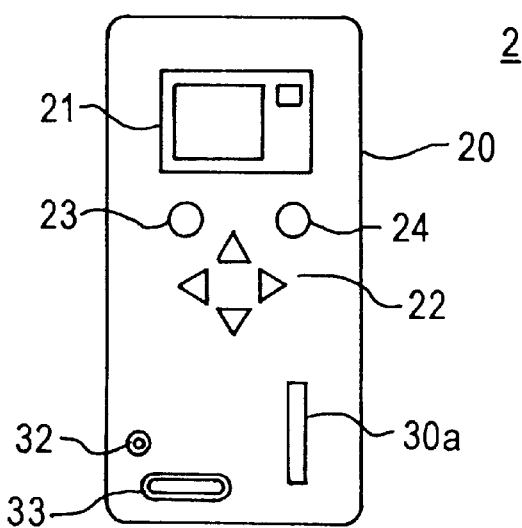

On the top of the housing 20 are provided zooming buttons 25a and 25b, manual focus buttons 26a and 26b, and a shutter button 27. As shown in FIG. 2b, on the back side of the housing 20 are provided a liquid crystal display 21, cursor buttons 22, a selection button 23, a cancel button 24, an analog output pin 32, a digital output pin 33, and a loading aperture 30a for the recording medium 4.

The liquid crystal display (LCD) 21 is used as a display means for an operation screen, and as an electronic finder. A photographer may set the photographic mode by the various buttons 22 through 24 on the back surface. Two-dimensional image signals are output from the analog output pin 32 in, for example, NTSC format. The digital output pin 33 is, for example, a SCSI pin.

Figure 3:
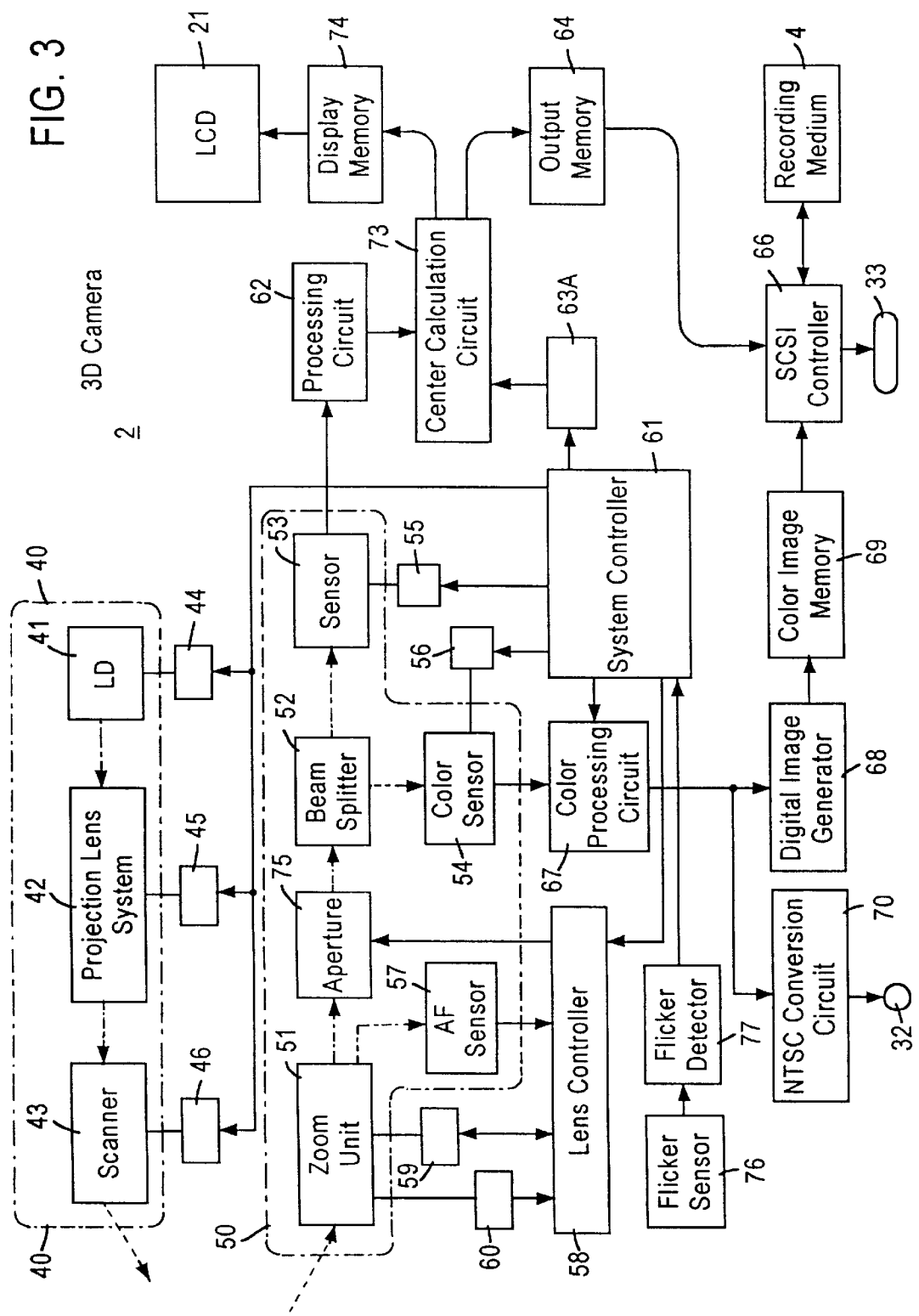
FIG. 3 is a block diagram of the functional structure of the three-dimensional camera.

FIG. 3 is a block diagram of the functional construction of the three-dimensional camera 2. The solid arrows in the drawing represent the flow of electrical signals, and the dashed arrows represent the flow of light.

The three-dimensional camera 2 is provided with two optical systems 40 and 50 on the light projection side and the light reception side which combined comprise the aforesaid optical unit OU, and a flicker sensor 76.

In the optical system 40 a laser beam emitted from a semiconductor laser (LD) and having a wavelength of 670 nm passes through the projection lens system 42 to form the slit light U, which is deflected by a galvano mirror (scanner) 43. The driver 44 of the semiconductor laser 41, the drive system 45 of the projection lens system 42, and the drive system 46 of the galvano mirror 43 are controlled by a system controller 61.

The light entering the optical system 50 sequentially passes through a zoom unit 51 and an aperture 75, and is subsequently split by a beam splitter 52. Light of the oscillation wavelength range of the semiconductor laser 41 enters the measurement sensor 53. Light of the visible light range enters the monitoring color sensor 54. The sensor 53 and the color sensor 54 both comprise a charge-coupled device (CCD) area sensor. The CCD sensors are provided with an integrating region (accumulation region) and a transfer region, such that when an integrating operation is completed in the integrating region, the loads of a plurality of pixels moves in a batch to the transfer region, and the load of each pixel is sequentially output from the transfer region to outside the device. As shown in the drawing, the aperture 75 is disposed medially to the zoom unit 51 and the beam splitter 52, so as to function as a light adjusting means relative to both the sensor 53 and the color sensor 54. An aperture value is supplied by the system controller 61 to the lens controller 58 for controlling the aperture 75. The zoom unit 51 is an internal focus type, which uses part of the entering light for autofocusing (AF). The AF function is realized by a AF sensor 57, a lens controller 58, and a focusing drive system 59. A zoom drive system 60 is provided for electric zooming.

A flicker sensor 76 mainly comprises a photoelectric conversion device of a hot transistor and hot diode, and outputs signals corresponding to the changed component of the background light to a flicker detector 77. The flicker detector 77 detects the period of change in the background light based on the signals from the flicker sensor 76, and transmits the detection result to the system controller 61. Specifically, the input signal is binarized, and a pulse synchronized with the change in background light is output.

The flow of object information in the three-dimensional camera 2 is described below.

First, the image sensing information of the sensor 53 is transferred to the output processing circuit 62 synchronously with the clock signal from the driver 55. The output processing circuit 62 is provided with an amplifier for amplifying the photoelectric conversion signal of each pixel output by the sensor 53, and an analog-to-digital (AD) converter for converting the photoelectric conversion signal to 8-bit photoreception data. The photoreception data obtained by the output processing circuit 62 is temporarily stored in a center calculation circuit 73. At this time, the address specification is set by the memory control circuit 63A. The center calculation circuit 73 calculates the base data for calculating the three-dimensional position based on the input photoreception data, and outputs this base data to the output memory 64. The center calculation circuit 73 generates a variable density image (distance image) corresponding to the shape of the measurement object, and outputs this image to the display memory 74. The screen of the LCD 21 displays the variable density image stored in the display memory 74, and displays the color image stored in the color image memory 69. The construction and operation of the center calculation circuit 73 is described later.

The image sensing information obtained by the color sensor 54 is transferred to the color processing circuit 67 synchronously with a clock signal from the driver 56. The color-processed image sensing information is then output online through the NTSC conversion circuit 70 and the analog output pin 32, or quantized by the digital image generator 68 and stored in the color image memory 66. Thereafter, the color image data are transferred from the color image memory 69 to the SCSI controller 66, and output online from the digital output pin 33, or stored on the recording medium 4 with the corresponding measurement data. The color image is an image having the same field angle as the distance image obtained by the sensor 53, and is used as reference information for application processing on the host 3 side. The processes which use the color information include, for example, processes generating three-dimensional models by combining measurement data of a plurality of groups having different camera viewpoints, and processes which cull unnecessary points from the three-dimensional mode. The system controller 61 corresponds to a generator not shown in the drawings, and supplies specifications for displaying suitable text and symbols on the screen of the LCD 21.

FIG. 4 shows an exemplary embodiment of the projection lens system 42. FIG. 4a shows a front view, and FIG. 4b shows a side view.

The projection lens system 42 comprises three lenses including a collimator lens 421, a varietor lens 422, and a expander lens 423. The laser beam emitted from the semiconductor laser 41 is subjected to optical processing in the following sequence to obtain a suitable slit light U. First, the laser beam is collimated by the collimator lens 421 to produce parallel rays. Then, the laser beam diameter is adjusted by the varietor lens 422. Finally, the beam is spread in the slit length direction M1 by the expander lens 423.

The varietor lens 422 is provided so that the slit light U having a width of three or more pixels enters the sensor 53 regardless of the field angle of photography or the distance of photography. The drive system 54 moves the varietor lens 422 so as to maintain a constant width w of the slit light U on the sensor 53 in accordance with specifications by the system controller 61. The varietor lens 422 and the zoom unit 51 on the photoreception side are linked.

Distortion of the slit light U can be reduced by spreading the slit length before deflection by the galvano mirror 43 as compared to spreading the slit light after deflection. The galvano mirror 43 can be made more compact by providing the expander lens 423 in the final stage of the projection lens system 42, i.e., by disposing the expander lens 423 near the galvano mirror 43.

FIG. 5 illustrates the principle of the calculation of the three-dimensional position by the measurement system 1. Only five light samplings are shown in the drawing to simplify understanding of the principle.

The object Q is illuminated by a relatively wide slit light U having a width of several pixels on the image sensing surface S2 of sensor 53. Specifically, the width of the slit light U is set at five pixels. The slit light U is deflected from the top to the bottom of the drawing to scan the object Q so as to move only one pixel pitch pv on the image sensing surface S2 with each sampling cycle. The photoreception data (photoelectric conversion information) of one frame are output from the sensor 53 in each sampling cycle. This deflection is actually accomplished at equi-angular speed.

In the present embodiment, when targeting a single pixel g on the image sensing surface S2, photoreception data are obtained 32 times by 32 samplings during the scan. The timing (time center Npeak, or center ip) by which the optical axis of the slit light U passes through the object surface in the range encircling the target pixel g is determined by the center calculation circuit relative to the photoreception data of the 32 samplings.

When the surface of the object Q is flat and there is no noise generated due to the characteristics of the optical system, more light is received by the target pixel g during the timing of the passage of the slit light U, and normally approaches a normal distribution, as shown in FIG. 5b. When a large amount of light is received in the timing between the nth sampling and the previous sampling (n−1), the timing matches the time center Npeak, as shown in the drawing.

The position (coordinates) of the object Q is calculated based on the relationship between the illumination direction of the slit light at the determined time center Npeak and the entrance direction of the slit light relative to the target pixel. In this way, a higher resolution measurement is possible than the resolution stipulated by the pixel pitch pv on the image sensing surface.

The amount of light received by the target pixel g is dependent on the reflectivity of the object Q. However, the relative percentage of the amount of received light of each sampling remains constant regardless of the absolute amount of received light. That is, variation in object color does not influence the measurement accuracy.

FIG. 6 shows an example of the readout range of the sensor 53. As shown in FIG. 6, the readout of one frame in sensor 53 is not accomplished for the entire image sensing surface S2, but rather for a target of only the effective photoreception range (a band-like image) Ae of part of the image sensing surface S2 so as to accomplish the readout at high speed. The effective photoreception range Ae is a range corresponding to the measurable distance range d' (refer to FIG. 18) of the object Q in the image sensing surface S2 at a particular illumination timing, and shifts one pixel at a time for each frame in accordance with the deflection of the slit light U. In the present embodiment, the number of pixels is fixed in the shift direction of the effective photoreception range Ae. The method of reading out only part of the sensed image of the CCD area sensor is disclosed in Japanese Laid-Open Patent No. HEI 7-174536.

Figure 7A:
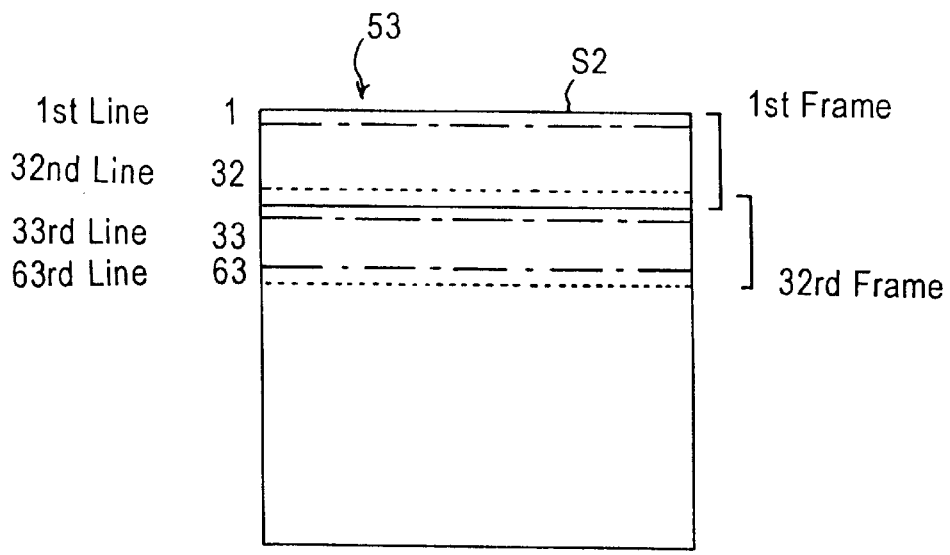
FIGS. 7(a) and 7(b) illustrate an example of the relationship between the lines and frames in the image sensing surface of the sensor.
Figure 7B:
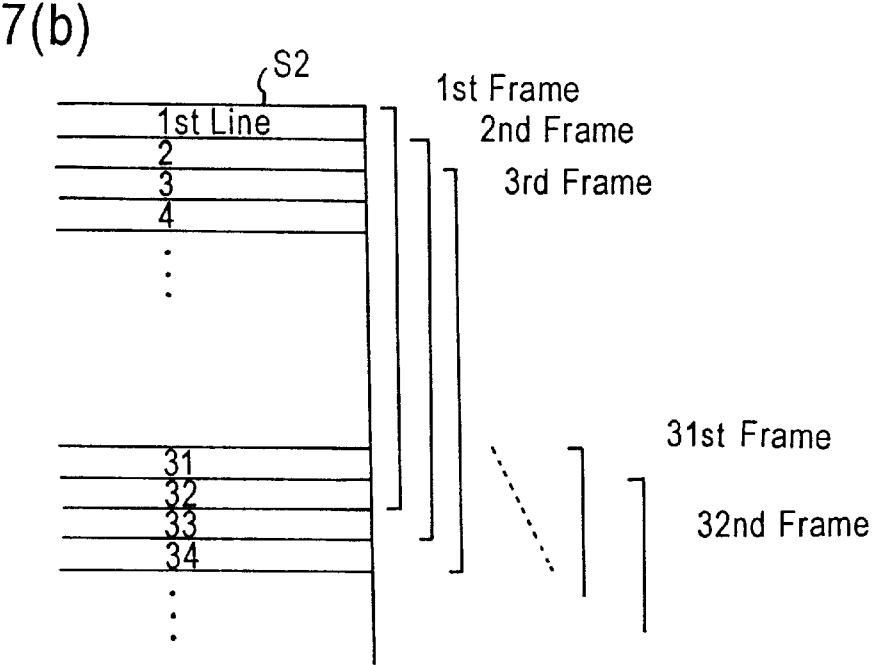
Figure 8:
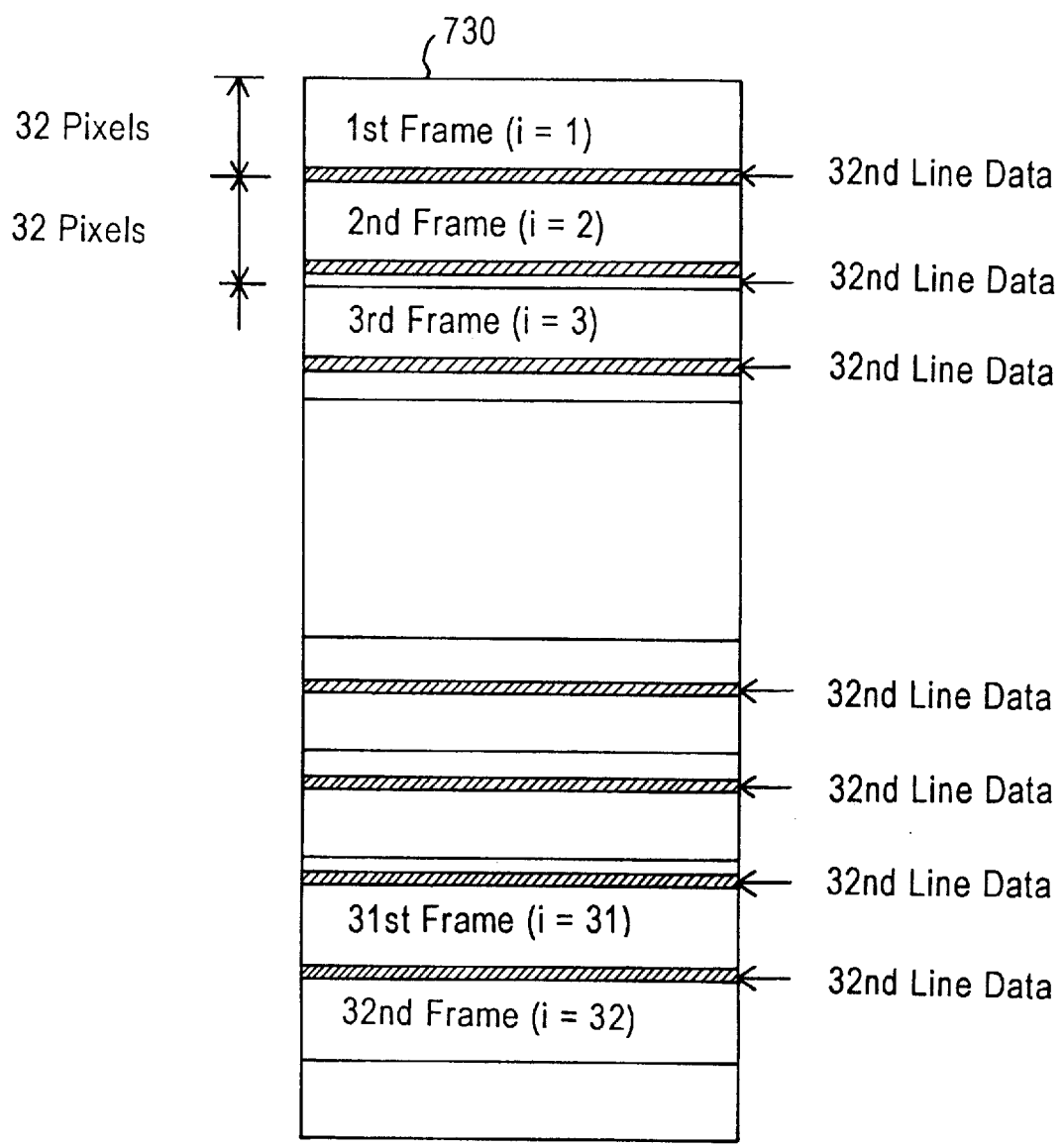
FIG. 8 shows an example of the recorded state of the photoreception data of each frame.
Figure 9:
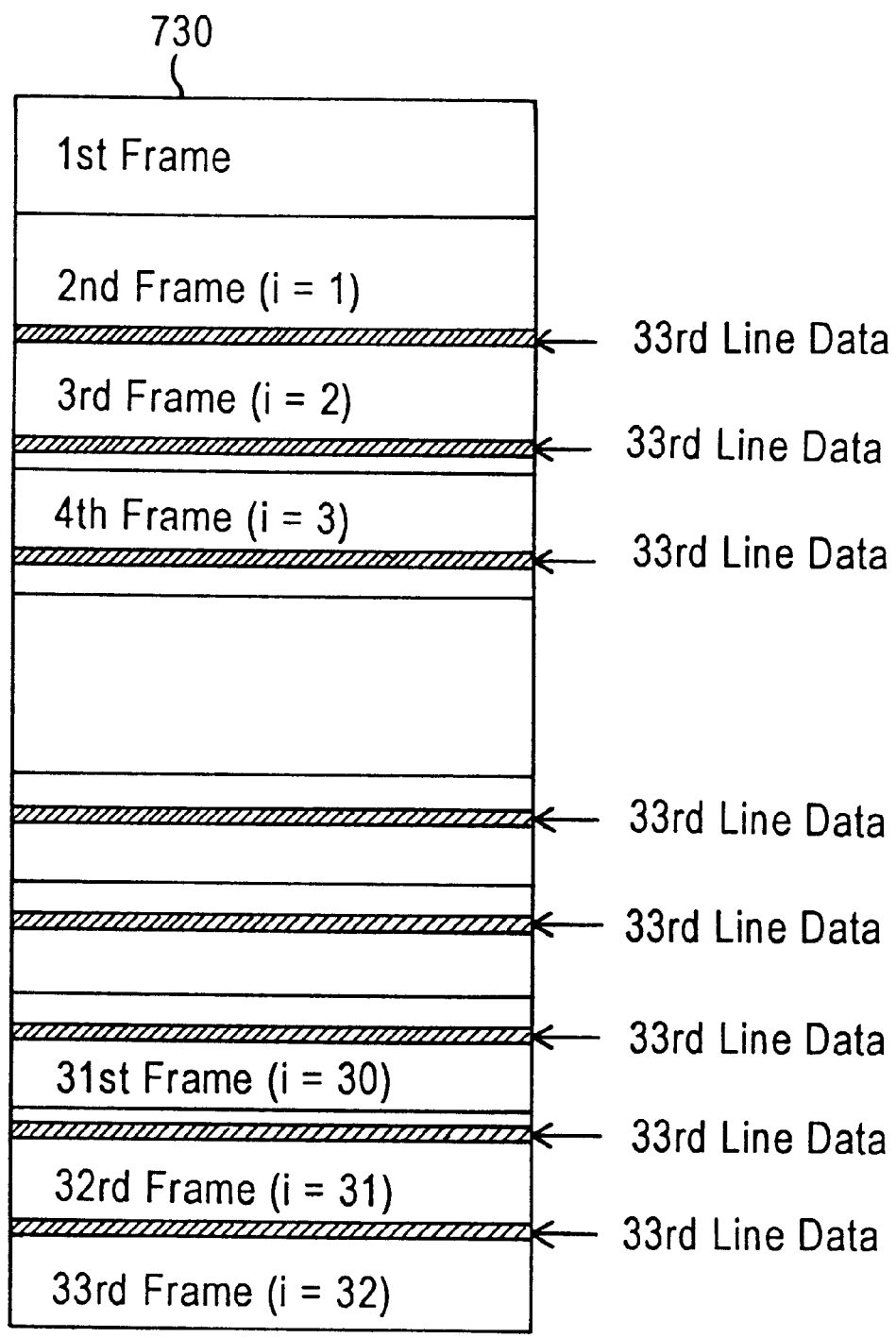
FIG. 9 shows an example of the recorded state of the photoreception data of each frame.
Figure 10:
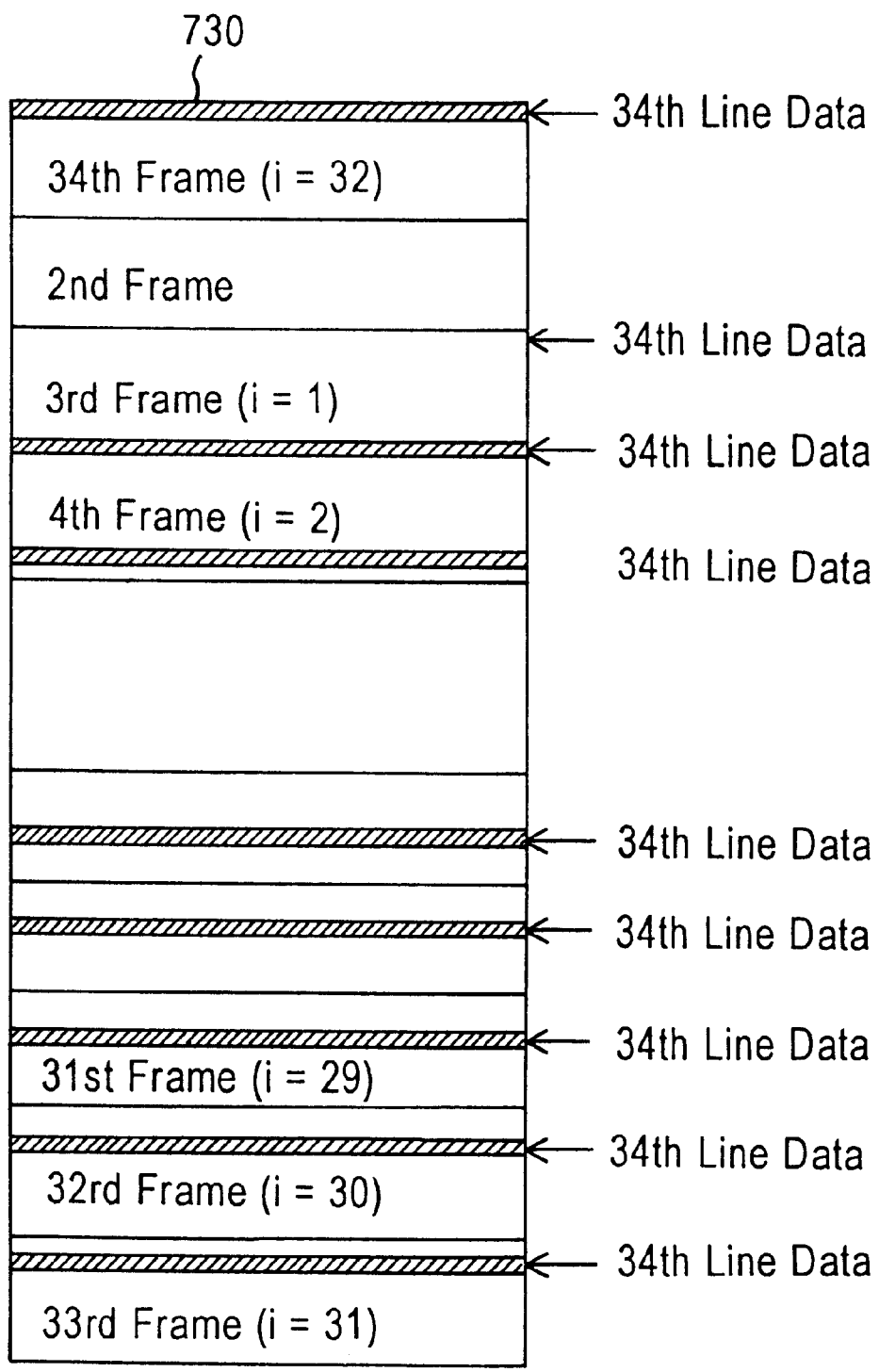
FIG. 10 shows an example of the recorded state of the photoreception data of each frame.

FIG. 7 illustrates an example of the relationship between the frame and the line in the image sensing surface S2 of the sensor 53. FIGS. 8 through 10 show examples of the state of recording of photoreception data of each frame.

As shown in FIG. 7, the initial frame 1 of the image sensing surface S2 includes photoreception data of 32 lines by 200 pixels of line 1 through line 32. Each subsequent frame shifts one line, such that frame 2 includes line 2 through line 33, and frame 3 includes line 3 through line 34. Frame 32 includes line 32 through line 63. One line comprises 200 pixels as stated above.

The photoreception data from frame 1 through frame 32 are sequentially stored in a memory 730 within the center calculation circuit 73 via the output processing circuit 62, as shown in FIG. 8. That is, the photoreception data of frames 1, 2, 3 and the like are sequentially stored in the memory 730. The data of line 32 included in each frame is shifted upward one line at a time for each frame, such that the 32nd line of frame 1 becomes the 31st line of frame 2. When the photoreception data from frame 1 through frame 32 are stored in the memory 730, each pixel of line 32 is subjected to the time center Npeak calculation.

The photoreception data of frame 33 are transferred and stored in the memory 730 while calculations are executed for line 32. As shown in FIG. 9, the photoreception data of frame 33 are sequentially stored in the next area of frame 32 in the memory 730. When the data of frame 33 are stored in the memory 730, the time center Npeak calculation is performed relative to each pixel of line 33 included in frame 2 through frame 33.

The photoreception data of frame 34 are transferred and stored in the memory 730 while calculations are executed for line 33. As shown in FIG. 10, the photoreception data of frame 34 overwrites the area storing the data of frame 1. At this time, the data of frame 1 may be safely overwritten and erased because the data have been processed. When the data of frame 34 are stored in the memory 730, the time center Npeak calculation is performed relative to each pixel of line 34. When the processing of the photoreception data of line 34 ends, the photoreception data of line 35 overwrite the area storing the data of frame 2.

In this way, the time center Npeak is calculated for a total of 200 lines up to the final line 231.

As described above, fresh data overwrites the areas storing sequentially unnecessary data among the photoreception data stored in the memory 730, thereby reducing the required capacity of the memory 730.

The construction of the center calculation circuit 73 and the time center calculation process executed by the center calculation circuit 73 are described below.

Figure 11:
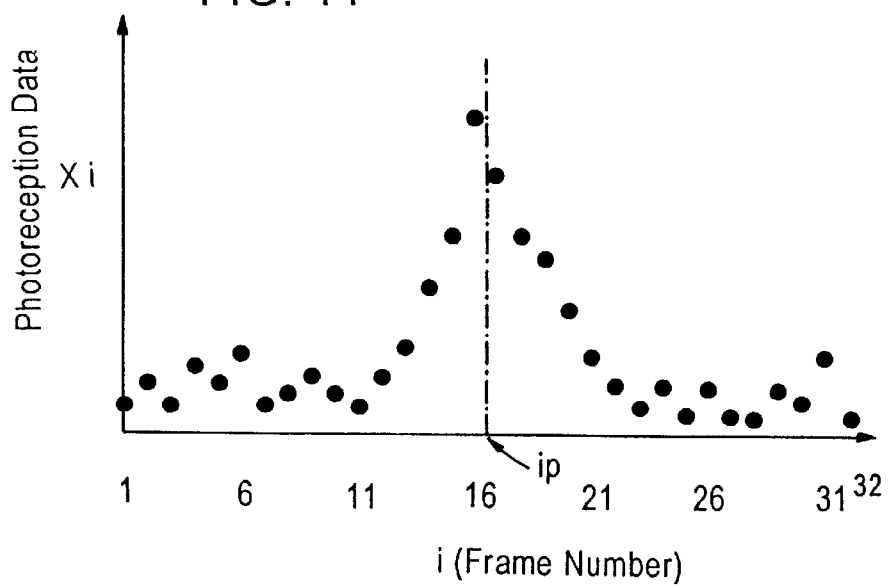
FIG. 11 illustrates the concept of the time center.
Figure 12:
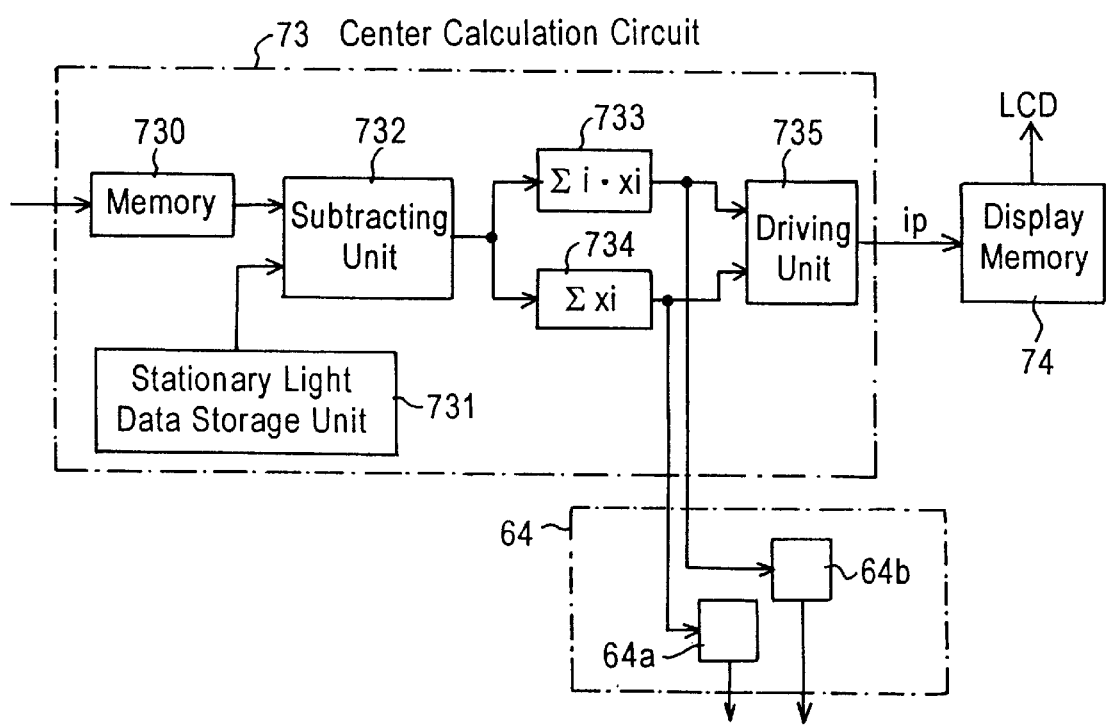
FIG. 12 is a block diagram showing an exemplary embodiment of the center calculation circuit.
Figure 13:
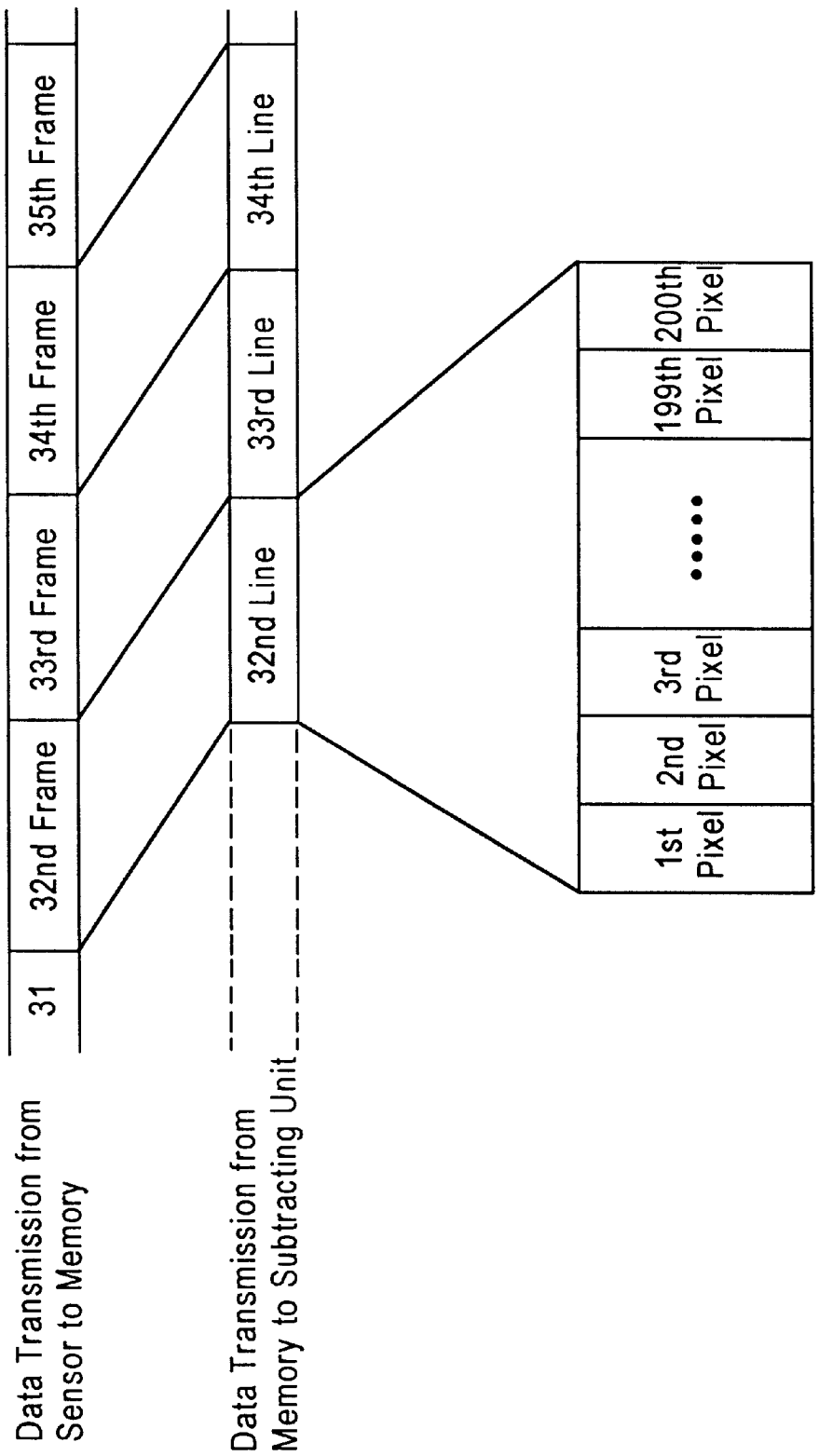
FIG. 13 illustrates the concept of the data transfer timing.

FIG. 11 illustrates the concept of the time center Npeak. FIG. 12 is a block diagram showing an exemplary embodiment of the center calculation circuit 73. FIG. 13 illustrates an example of the concept of the data transfer timing.

As shown in FIG. 11, the time center Npeak is the center of 32 individual photoreception data obtained by 32 samplings. A sampling number of 1 through 32 is appended to the 32 individual photoreception data of each pixel. The number i photoreception data is expressed as xi. The symbol i is an integer from 1 to 32. At this time, the symbol i of one pixel expresses the frame number after the pixel enters the effective photoreception range Ae.

The center ip of the photoreception data x1 through x32 of numbers 1 through 32 is determined by dividing the sum $\Sigma i \cdot xi$ of values $i \cdot xi$ by the sum $\Sigma i$ of xi for the 32 individual photoreception data.

$$ip = \frac{\sum_{i=1}^{32} i \cdot xi}{\sum_{i=1}^{32} xi}$$

The center calculation circuit 73 calculates the center ip (i.e., the time center Npeak) of each pixel based on the data read out from the memory 730. The data read out from the memory 730 is not used directly, but rather a value is used which is derived by subtracting a stationary light data ks from each data (when this value is negative, a value of zero is used). That is, only the stationary value ks is deducted from the photoreception data output from the sensor 53 to effect an offset.

The stationary value ks is data calculated based on the photoreception data of a pixel when slit light U does not enter the sensor. The stationary value ks may be determined using a predetermined fixed value, or may be determined in real time using data output from the sensor 53. When a fixed value is used, and when the output of the sensor 53 is an 8-bit value (256 gradients), the fixed value may be, for example, (5), (6), or (10). When the stationary value ks value is determined in real time, the average value is determined for photoreception data of two pixels before and after the target pixel among the 32 individual photoreception data, and the smallest average value may be set as the stationary value ks. The reason for this is that the slit light U does not enter the sensor either before or after the effective photoreception region Ae, and the photoreception data can be accurately determined in real time when the slit light U does not enter this region. Furthermore, the largest average value of the photoreception data of the before and after pixels also may be set as the stationary value ks. The average value of the two before pixels of the 32 individual photoreception data, or the average value of the two after pixels of the 32 individual photoreception data also may be used. The photoreception data of a single pixel also may be used. A predetermined value (e.g., 5) may be added to the aforesaid values depending on the shape of the object Q or the state of noise included in the photoreception data and used as the stationary value ks, so as to increase the offset, and accurately cut the unnecessary noise component. In these instances, the size of one frame may be 36 lines, or 34 lines, or 33 lines, and the 32 individual data of 32 lines may be used in the calculation of the center ip.

As shown in FIG. 12, the center calculation circuit 73 comprises a memory 730, a stationary light data storage unit 731, a subtracting unit 732, a first adding unit 733, a second adding unit 734, and a dividing unit 735. Although these units are formed by hardware circuits, they may also be formed entirely or in part by software.

The stationary light data storage unit 731 stores the stationary light data ks. The subtracting unit 732 subtracts the stationary light data ks from the photoreception data. The data output from the subtracting unit 732 may be used as the photoreception data xi. The first adding unit 733 adds i·xi (where i=1 to 32) to the aforesaid value, and outputs the total value. The second adding unit 734 adds xi to the aforesaid value (where i=1 to 32), and outputs the total value. The dividing unit 735 divides the output value of the first adding unit 733 by the output value of the second adding unit 734, and outputs the resulting value as the center ip. The center ip output from the dividing unit 735 is stored in the display memory 74. The output value of the first adding unit 733 and the output value of the second adding unit 734 are stored in predetermined areas 64a and 64b of the output memory 64. The data stored in the output memory 64 are output from the digital output pin 33 via the SCSI controller 66 to a host 3, or are stored on the recording media 4. In the host 3, three-dimensional position calculation processing is executed based on the aforesaid data, and the data reliability is determined.

The dividing unit 735 outputs the center ip at the moment the 32 individual photoreception data are input to the center calculation circuit 73. Then, two pixel data, three pixel data and on to the 200 pixel data are sequentially processed, and the calculation of the center ip of line 32 ends. When the calculation of the center ip of line 32 ends, the center ip is calculated for line 33, line 34, line 35 and on to line 231 for all 200 lines.

The center ip stored in the display memory 74 is displayed on the screen of the LCD 21. The center ip is linked to the position of the surface of the measurement object Q, such that the value of the center ip increases when the position of the surface of the object Q approaches the three-dimensional camera 2, and the value of the center ip decreases as the position on the surface of the object Q is farther from the camera 2. Accordingly, the distance distribution can be expressed by displaying a variable density image using the center ip as the density data.

In order to increase the accuracy of the center ip, the background light must be considered as described below when controlling the three-dimensional camera 2.

FIG. 14 illustrates an example of the influence of change in the background lighting. FIG. 15 illustrates a method for preventing a shift of the center ip due to change of the background lighting.

Figure 14A:
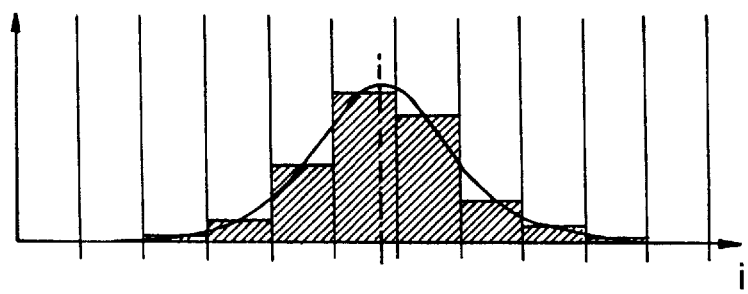
FIGS. 14(a), 14(b), 14(c) and 14(d) illustrate an example of the influence of the change in background light.
Figure 14B:
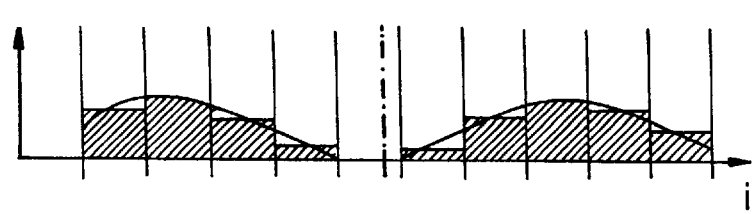
Figure 14C:
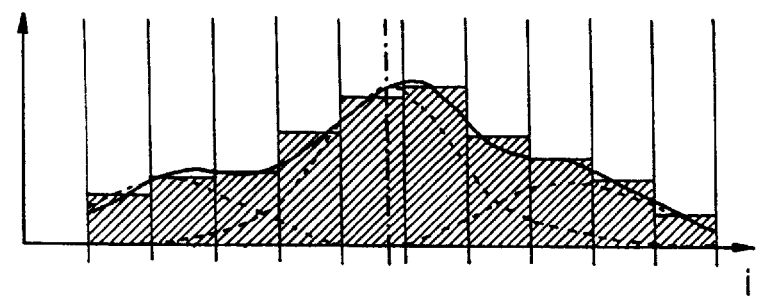
Figure 14D:
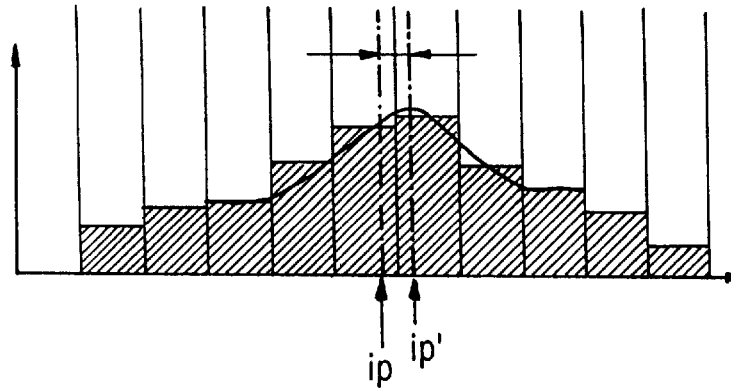

When, for example, measurement is made in an environment in which the background light changes periodically as within a room illuminated by fluorescent light, a different offset component (background light component) is generated for each frame in the output of the sensor 53 as indicated by the shaded portion of FIG. 14b due to the interference between the frame cycle of the sensor 53 and the change cycle of the background light. In this state, when the entering slit light has the distribution shown in FIG. 14a, the light entering the sensor 53 has the distribution shown in FIG. 14c. As a result, the photoreception data of each frame obtained by the integration of the frame period of the sensor 53 is shown in FIG. 14d. In this way, a discrepancy arises between the actual center ip and the center ip calculated based on the photoreception data.

Figure 15A:
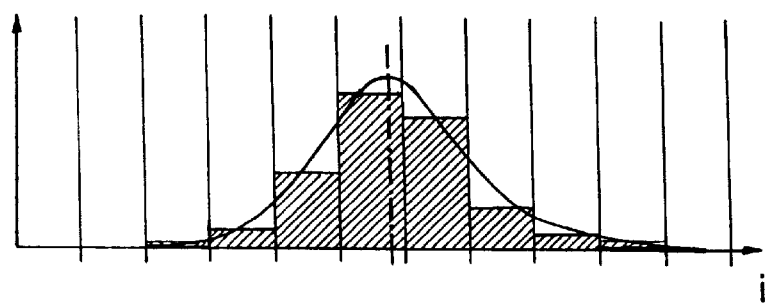
FIGS. 15(a), 15(b), 15(c) and 15(d) illustrate a method for preventing discrepancy in the center ip caused by the change in the background light.

To prevent this discrepancy, the system controller 61 controls the driver 55 so as to set the frame frequency of the sensor 53 relative to the change frequency f (Hz) of the background light detected by the flicker detector 77 to f/m (Hz). The value m is an optional integer. That is, the frame cycle of the sensor 53 is set at m times the change frequency of the background light. FIG. 15(a) shows the condition when the sensor 53 is driven at m=1, i.e., at the frame frequency f (Hz).

Figure 15B:
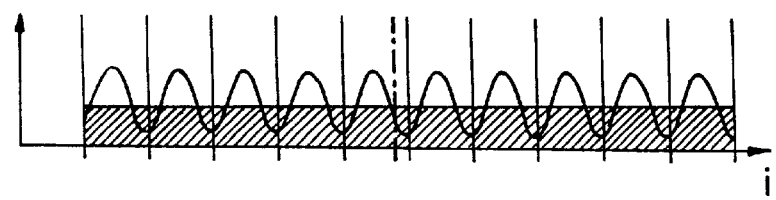
Figure 15C:
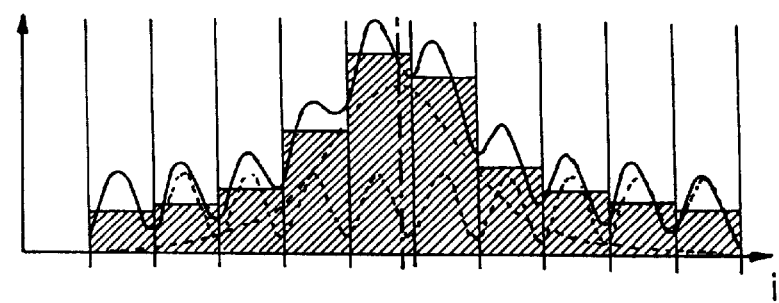
Figure 15D:
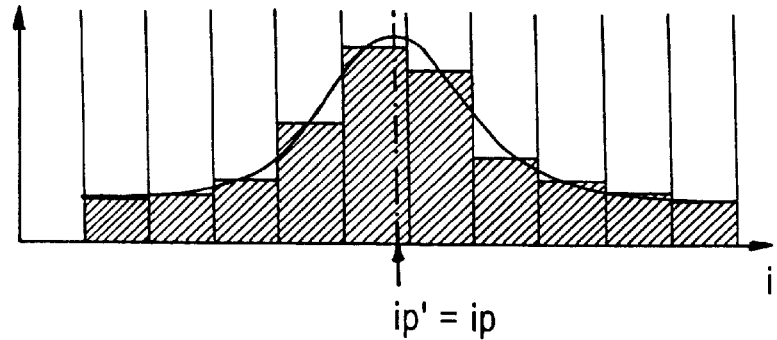

Since the frame cycle matches the change cycle of the background light, the offset component of each frame is equal between frames, as shown in FIG. 15b. Therefore, the light entering the sensor 53 comprises the slit light and the background light and changes periodically as shown in FIG. 15c, but the photoreception data obtained from the entering light integrated by the frame cycle comprises values derived by overlaying a constant offset component on all frames as shown in FIG. 15d, such that the resulting center calculation based on the aforesaid photoreception data matches the actual center ip.

The combination of the measurement sequence and the operation of the three-dimensional camera 2 and the host 3 is described below. As described above, the measurement sampling points are set at 200×262. That is, the number of pixels in the width direction of the slit light U on the image sensing surface S2 is set at 262, and the actual number of frames N is set at 231. As a user (photographer) views the color image displayed on the LCD 21, the camera position and direction is determined, and the field angle is set. A zoom scan is executed as necessary at this time. During these operations, the LCD 21 displays the color monitor image with exposure control. When a user specifies the start of measurement (takes the distance image), the lens controller 58 adjusts the aperture value to achieve the optimum entrance light to the sensor 53. The lens controller 58 adjusts the aperture value to achieve optimum entrance light to the color sensor 54 when taking the color image stored in the color image memory 69. The color image is taken with a timing directly before or directly after taking the distance image, and the distance image and the color image are not taken simultaneously.

The following effects are obtained by switching the aperture value for the color image and the distance image.

(1) The depth of field can be maintained without the adverse effects of defocusing caused by color distortion of the light receiving lens.

(2) The distance image can be focused along the entire area of the measurement range.

(3) The luminance ratio of the background light component and the laser component of the distance image can be controlled at a constant ratio.

(4) The dynamic range of the color image can be maintained while increasing the S/N ratio.

Figure 16:
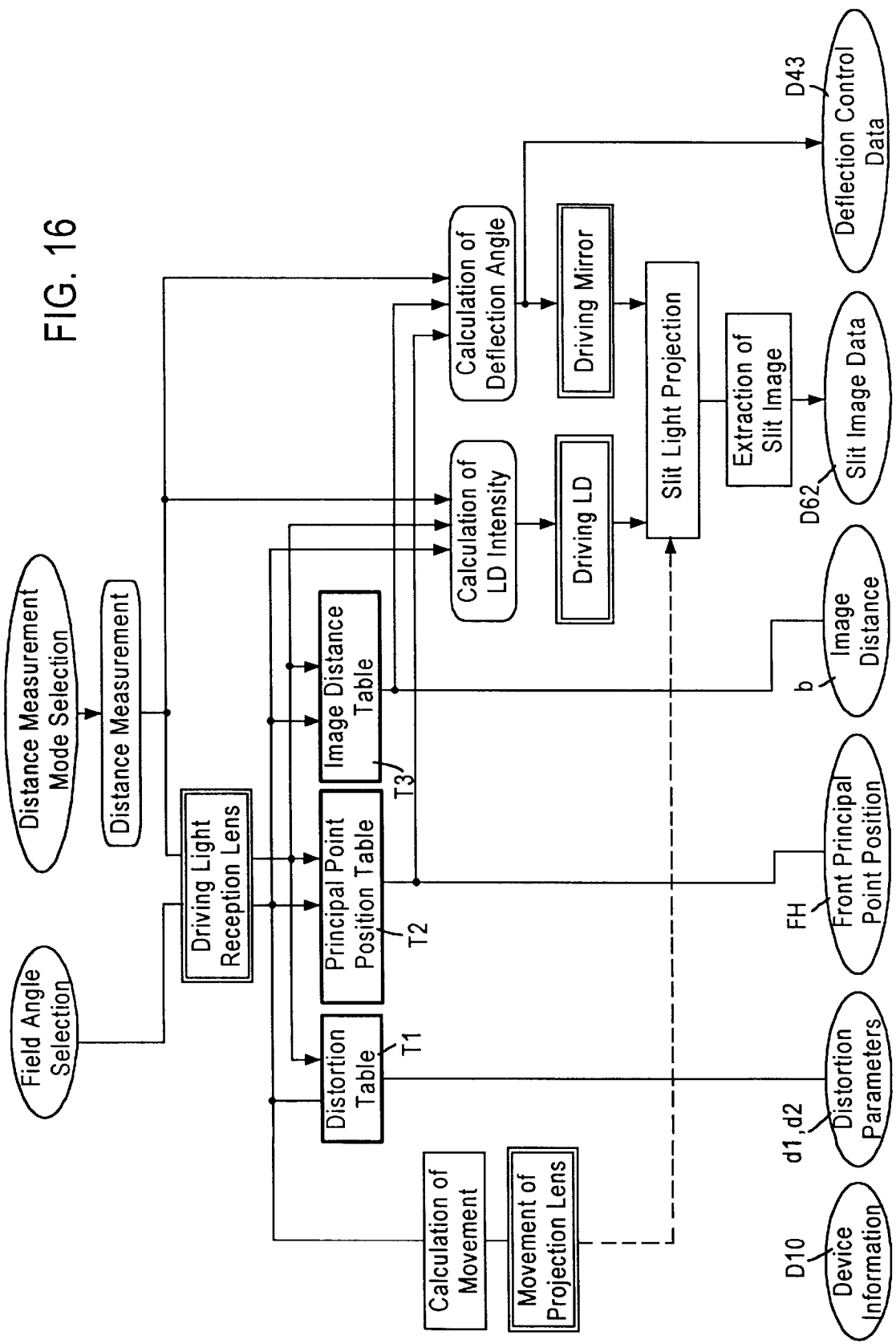
FIG. 16 shows an example of the flow of data in the three-dimensional camera.
Figure 17:
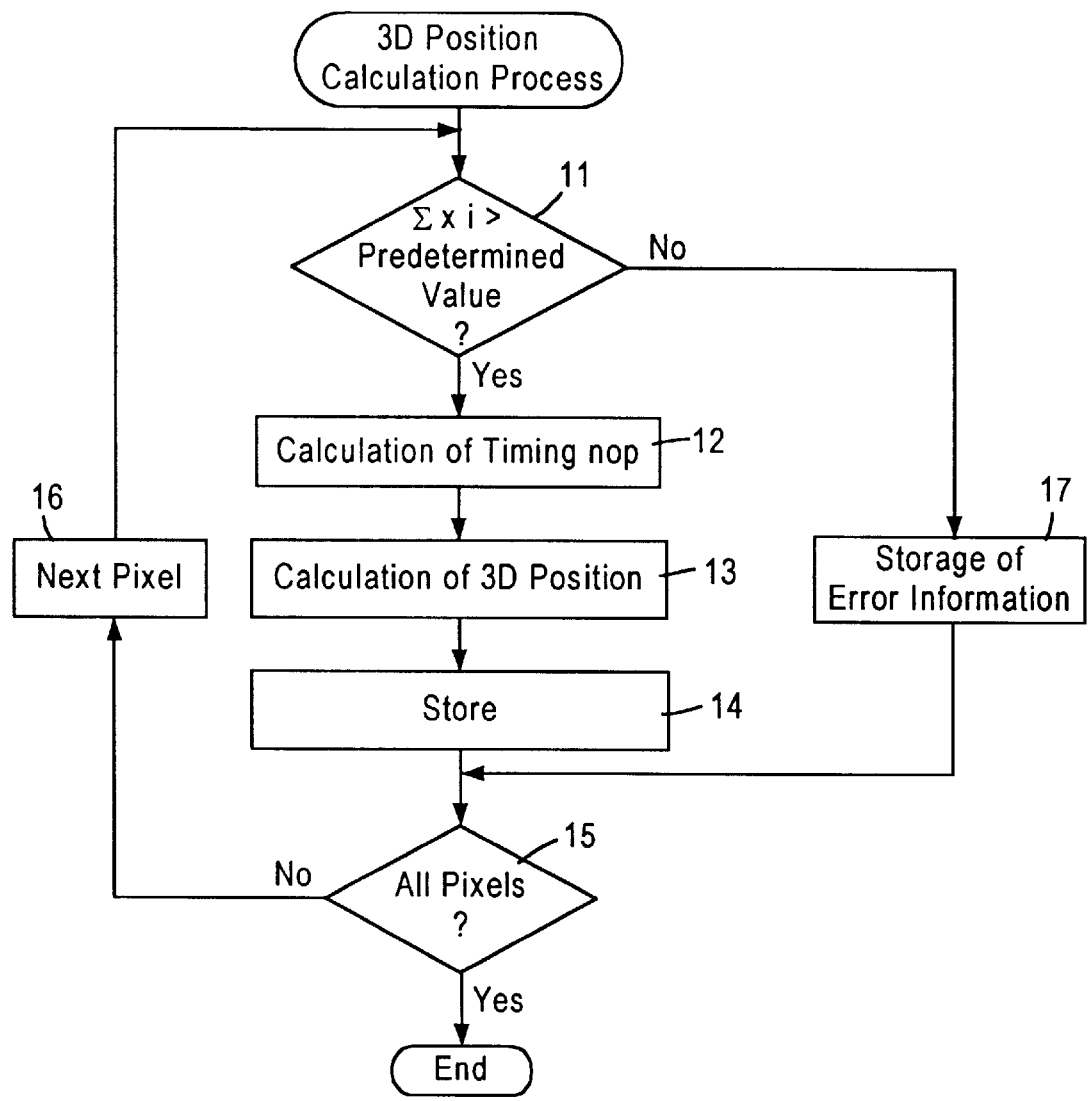
FIG. 17 is a flow chart showing the processing sequence of the three-dimensional position calculation by the host.
Figure 18:
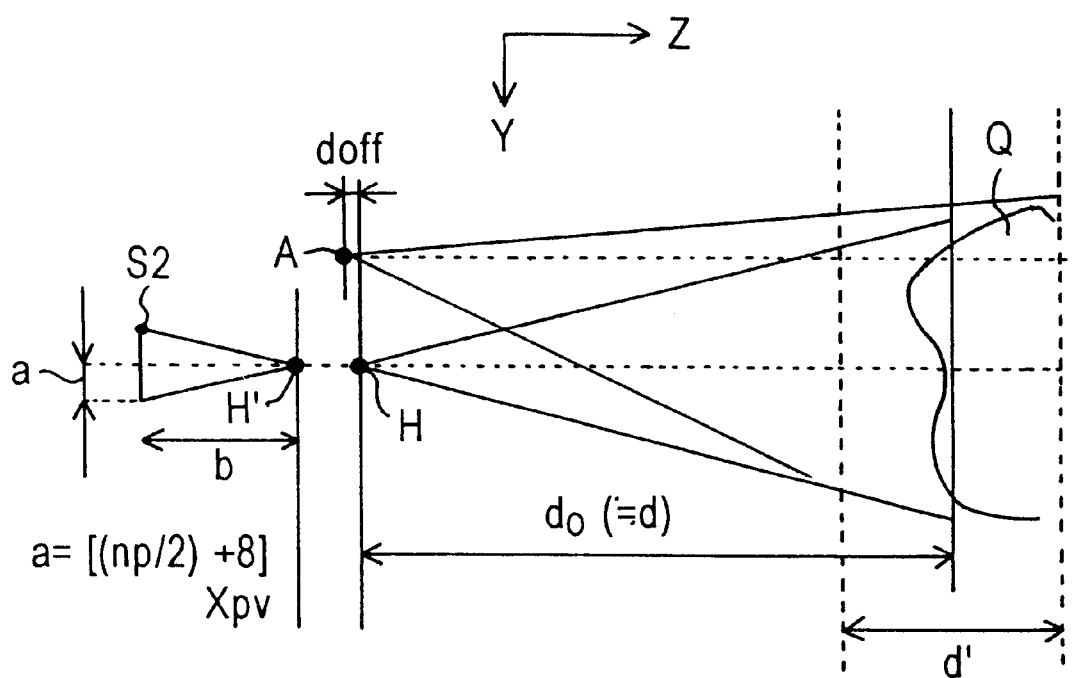
FIG. 18 illustrates the relationship between the object and each point of the optical system.

FIG. 16 shows an example of the flow of data in the three-dimensional camera 2. FIG. 17 is a flow chart showing the processing sequence of the three-dimensional position calculation in the host 3. FIG. 18 shows the relationship between each point in the optical system and the object Q.

The varietor part of the zoom unit 51 is moved in response to the field angle selection operation (zooming) by a user (S31). Focusing may be accomplished manually or automatically by moving the focusing elements. In broad terms, the object distance d0 is measured during the focusing processes (S30).

The amount of movement of the projection side varietor lens 422 is calculated by a calculation circuit not shown in the drawing (S32), and the movement of the varietor lens 422 is controlled based on the calculation result via a lens drive unit of the photoreception optical system (S33).

The system controller 61 reads the output of the focusing encoder 59A (feedout Ed), and the output of the zooming encoder 60A (zoom value fp) via the lens controller 58. Within the system controller 61, a distortion table T1, principal point position table T2, and image distance table T3 are referenced, and the photographic condition data corresponding to the feedout Ed and the zoom value fp are output to the host 3. The photographic condition data include the distortion parameters (lens distortion correction coefficients d1 and d2), and the front principal point position FH, and image distance b. Since the front endpoint F is fixed, the front principal point H can be specified by the front principal point position FH.

The system controller 61 calculates the output of semiconductor laser 41 (laser intensity) (S34) and the deflection conditions (scan start angle, scan end angle, angular speed of deflection) of the slit light U (S35). The calculation method is described in detail below.

First, the projection angle is set so as to receive the reflected light in the center of the sensor 53, since generally the object distance d0 assumes a flat surfaced object. The pulse lighting for calculating the laser intensity described below is executed at the set projection angle.

Then, the laser intensity is calculated (S34). When calculating the laser intensity, it is essential to consider safety factors since the measurement object may be a person. Initially, the laser diode LD 41 is pulse lighted at a minimum intensity LDmin, and the output from the sensor 53 is received. At this time, the aperture 75 is controlled to an open state aperture value F (OPEN). The ratio of the maximum value MAX [(Son(LDmin), F(OPEN)] among the signals of a plurality of pixels, and the optimum level Styp is calculated, and a provisional aperture value F (LD1) is set. Son is the intensity of the light of the laser diode LD 41 as measured by the sensor 53. This aperture value F (LD1) is a value which restricts most entrance light when the laser intensity is at a maximum level.

$$F(LD1)=\frac{F(OPEN)}{\sqrt{(MAX[Son(LDmi,F(OEN))]/Styp \cdot (LDmx/LDmin)}}$$

The laser intensity LD is set as the safe level limit of the maximum value LDmax, and the pulse lighting is again executed at aperture value F (LD1), and the output of the sensor 53 is received. If the received signals [Son(LDmax), F(LD1)] are at or near the optimum level Styp, the aperture value F (LD1) is set as the measurement aperture value Fs. If these signals are not near the optimum level Styp, the aperture value F (LD1) is again calculated from MAX [Son(LDmax, F(LD1))], and the output of the sensor 53 at the new aperture value F (LD1) is compared to the optimum level Styp. The provisional setting of the aperture value F (LD1) is repeated and its suitability verified until the output of the sensor 53 is a value within the permitted range.

The output of the sensor 53 is examined for the entire surface of the image sensing surface S2. This examination is executed because it is difficult to estimate the reception position of the slit light U with a high degree of accuracy when performing a passive distance calculation via the autofocus (AF) function. The load integration time in the sensor 53 is one field time (e.g., 1/60 sec), such that the actual measurement time is longer than the integration time. In this way, sensor output equivalent to the measurement time is obtained by pulse lighting. Then, the object distance d is determined by trigonometric survey from the projection angle and the reception position of the slit light U when the laser intensity has been set.

Finally, the deflection conditions are calculated based on the determined object distance d (S35). When calculating the deflection conditions, consideration must be given to the offset doff in the Z direction of the origin point A and the front principal point H, which is the distance reference point for the object distance d. A predetermined amount of overscan (e.g., 8 pixels) is set to maintain a measurable distance range d' similar to the center area. The scan start angle th1, the scan end angle th2, and the angular speed of deflection ω are expressed by the following equation.

$$th1 = \tan^{-1}[\beta xpv(np/2+8)+L)/(d+doff)] \times 180/\pi$$

$$th2 = \tan^{-1}[-\beta xpv(np/2+8)+L)/(d+doff)] \times 180/\pi$$

$$\omega = (th1-th2)/np$$

Where β represents the image sensing magnification (β=d/actual focal length freal); pv represents the pixel pitch; np represents the effective number of pixels in the Y direction of the image sensing surface S2; and L represents the baseline length.

In this way, the next emitted light is moved under the calculated conditions (S37) to scan (slit projection) the object Q (S38, S39), and the data D62 stored in the output memory 64 is transmitted to the host 3 via the output processing circuit 62 and the center calculation circuit 73. At the same time, the deflection conditions (deflection control data) and the device information D10 expressing the specifications of the sensor 53 are transmitted to the host 3. Table 1 shows the data transmitted from the three-dimensional camera 2 to the host 3.

TABLE 1

| | Data Content | Data Range |
|---|---|---|
| Measurement data | Σxi | 200 × 200 × 13 bit |
| | Σi · xi | 200 × 200 × 18 bit |
| Photographic conditions | Image distance b | 0.000~200.000 |
| | Front principal point position FH | 0.00~300.00 |
| | Slit deflection start angle h | |
| | Angular speed of deflection ω | |
| Device information | Number of pixels used for measurement (sampling number in X and Y directions) | 1~ |
| | Sensor pixel pitch pu,pv | ~0.00516~ |
| | Projection posture (around X,Y,Z axes) | 0.00~±90.00 |
| | Projection posture (X,Y,Z axes directions) | 0.00~±300.00 |
| | Lens distortion correction coefficients d1, d2 | |
| | Sensor center pixels u0,v0 | 0.00~256.00 |
| Two-dimensional image | R plane 512 × 512 × 8 bit | 0~255 |
| | G plane 512 × 512 × 8 bit | 0~255 |
| | B plane 512 × 512 × 8 bit | 0~255 |

As shown in FIG. 17, in the host 3, the three-dimensional position calculation process is executed, to calculate the three-dimensional position (coordinates X,Y,Z) of the 200×200 pixels of the sampling points (pixels). The sampling points intersect at the line of sight of the camera (solid line connecting the sampling point and the front principal point H) and the slit surface (optical axis of the slit light U illuminating the sampling point).

In FIG. 17, first, a determination is made as to whether or not the sum Σxi of the values xi transmitted from the three-dimensional camera 2 is greater than a predetermined value (S11). Since substantial error is included when xi is small, i.e., when the sum Σxi of the slit light component does not satisfy a predetermined criterion, the three-dimensional position calculation cannot be executed for the target pixel. Therefore, data expressing an [error] is set and stored in memory for this pixel (S17). Since adequate accuracy is obtained when the sum Σxi is greater than a predetermined value, the three-dimensional position calculation is executed.

The timing nop for the passage of the slit light U is calculated prior to the three-dimensional position calculation (S12). The passage timing nop is calculated by calculating (Σi.xi)/(Σxi) (where i=1 to 32), determining the center ip (time center Npeak), and adding the line number to the obtained value.

The calculated center ip is converted to the passage timing nop from the scan start by adding the line number because the timing within the 32 frames is obtained by the pixel output. Specifically, the line number is "32" for the pixels of the initially calculated line 32, and the line number is "33" for the pixels of the next line 33. The line number is increased by 1 each time the line of the target pixel g advances one line. It is possible the values may be set at other values than those listed above. The reason is that when the three-dimensional position is calculated, the rotation angle (the1) around the X axis and the angular speed (the4) around the X axis expressed in equation (3) below as a coefficient may be suitably set by calibration.

Then, the three-dimensional position calculation is executed (S13). The calculated three-dimensional position is stored in a memory area corresponding to the target pixel (S14), then similar processing is executed for the next pixel (S16). The process ends when all pixels have been processed (S15: YES).

The method of calculating the three-dimensional position is described below.

The camera line of sight equation is represented by equations (1) and (2) below.

$$(u-u0)=)xp)=(b/pu)\times[X/(Z-FH)] \quad (1)$$

$$(v-v0)=(yp)=(b/pv)\times[Y/(Z-FHG)] \quad (2)$$

Where b represents the image distance; FH represents the front principal point position; pu represents the pixel pitch in the horizontal direction of the image sensing surface; pv represents the pixel pitch in the vertical direction of the image sensing surface; u represents the pixel position in the horizontal direction on the image sensing surface; u0 represents the center pixel position in the horizontal direction on the image sensing surface; v represents the pixel position in the vertical direction of the image sensing surface; and vo represents the center pixel position in the vertical direction of the image sensing surface.

The slit plane equation is expressed by equation (3) below.

$$\begin{bmatrix} \cos(the3) & -\sin(the3) & 0 \\ \sin(the3) & \cos(the3) & 0 \\ 0 & 0 & 1 \end{bmatrix} \times \begin{bmatrix} \cos(the2) & 0 & \sin(the2) \\ 0 & 1 & 0 \\ -\sin(the2) & 0 & \cos(the2) \end{bmatrix} \times \begin{bmatrix} 0 \\ 1 \\ 0 \end{bmatrix} \times [X \quad Y-L \quad Z-s] = 0 \quad (3)$$

Where the1 represents the rotation angle around the X axis; the2 represents the inclination angle around the Y axis; the3 represents the inclination angle around the Z axis; the4 represents the angular speed around the X axis; nop represents the passage timing (nop=time center Npeak+line number); L represents the baseline length; and s represents the offset from origin point A.

Much of the aberration is dependent on the field angle. Distortion is generated in the object with the center pixel as the center. Accordingly, the amount of distortion is expressed as a function of the distance from the center pixel. This distortion approaches a cubic function of the distance. A second degree correction coefficient is designated d1, and a third degree correction coefficient is designated d2. After correction the pixel positions u' and v' are expressed by equations (4) and (5), respectively.

$$u'=u+d1\times t2^2\times(u-u0)/t2+d2\times t2^3\times(u-u0)/t2 \quad (4)$$

$$v'=v+d1\times t2^2\times(v-v0)/t2+d2\times t2^3\times(v-v0)/t2 \quad (5)$$

$$t2=(t1)^{-2}$$

$$t1=(u-u0)^2+(v-v0)^2$$

When u' is substituted for u, and v' is substituted for v in equations (1) and (2) above, the aberration-adjusted three-dimensional position can be determined. The calibration method is described in detail by Onodera and Kanetani, The Institute of Electronics, Information and Communications Engineers Research Report PRU 91-113, "Optical correction of image not requiring camera positioning;" and Ueshiba, Yoshimi, Oshima et al., Journal of The Institute of Electronics, Information and Communications Engineers D-II vol. J74-D-II, No. 9, pp. 1127–1235, 1991/9, "High precision calibration method for rangefinder based on three-dimensional model optical system."

Figure 19:
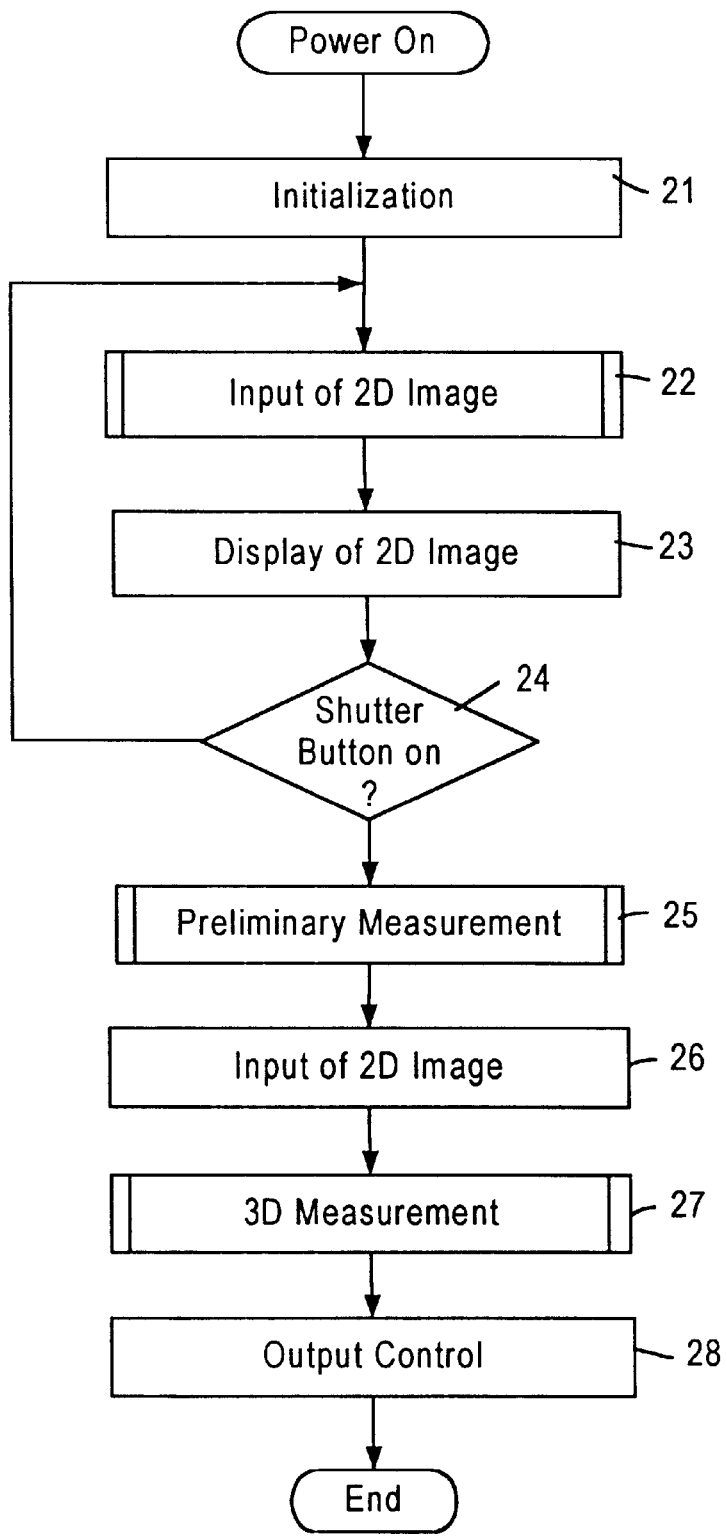
FIG. 19 is a flow chart briefly showing an example of the control of the three-dimensional camera.

FIG. 19 is a flow chart briefly showing an example of the control of the three-dimensional camera 2.

When power is switched ON and the initialization process ends, the system controller 61 repeats the two-dimensional photography and display of the two-dimensional image until the shutter button 27 is pressed (S21 to S24). The system controller 61 sequentially executes processes for preliminary measurement (S25), two-dimensional image input (S26), three-dimensional measurement (S27), and output control (S28) in accordance with the pressing of the shutter button 27. In the output control routine, controls are executed for data output to the host 3 or the recording medium 4, and the display of the distance image.

Figure 20:
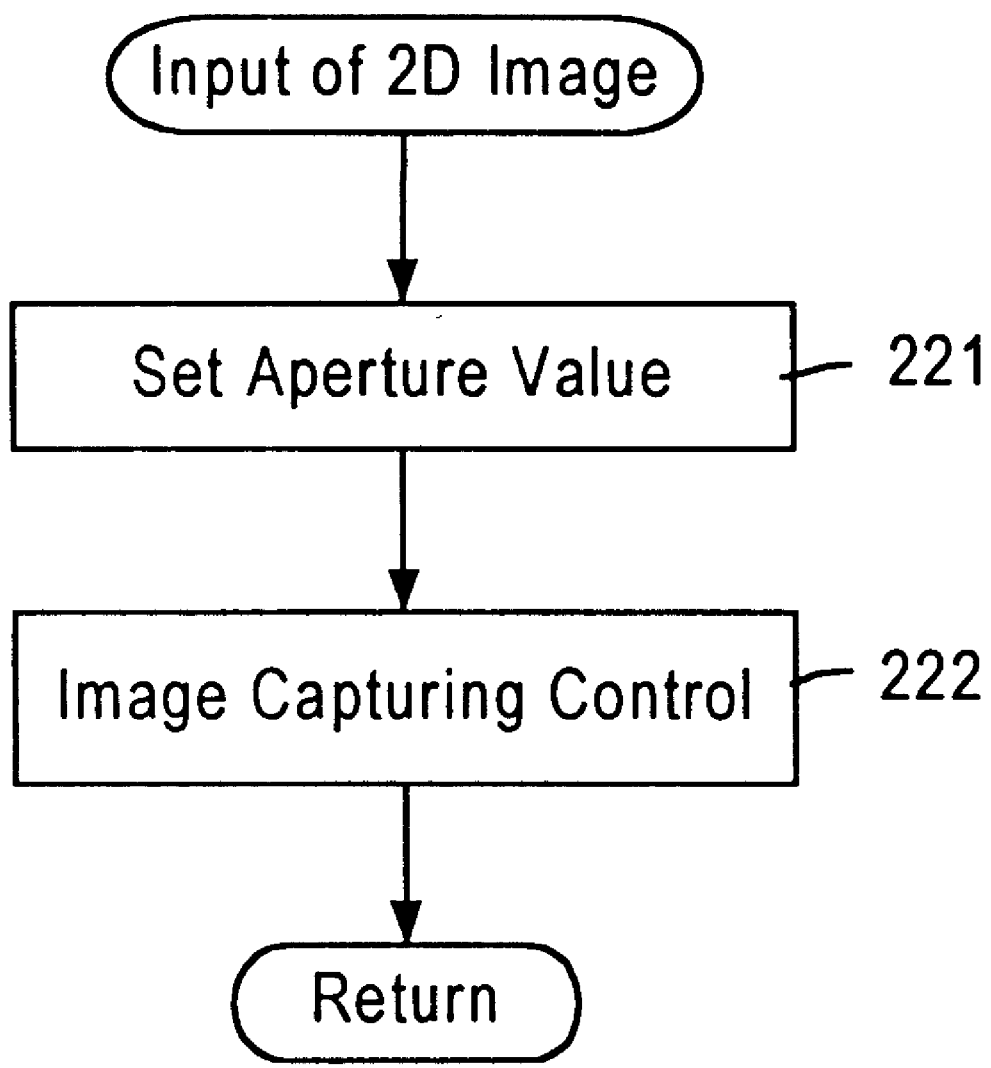
FIG. 20 is a flow chart of an exemplary two-dimensional image input subroutine.

FIG. 20 is a flow chart of an exemplary two-dimensional image input subroutine.

An aperture value is set which is suitable for color image sensing, drive 56 is controlled, and a color image is taken (S221 and S222).

Figure 21:
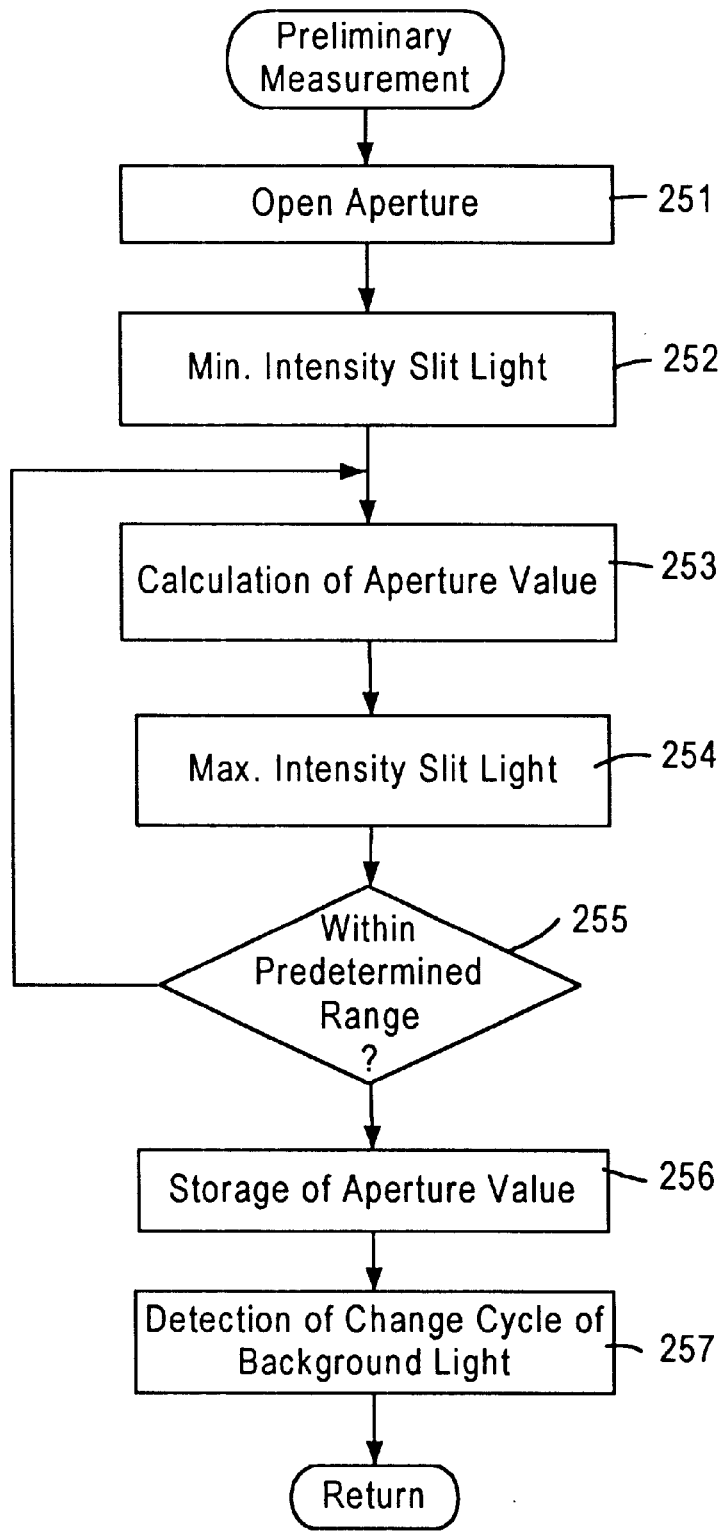
FIG. 21 is a flow chart of an exemplary preliminary measurement subroutine.

FIG. 21 is a flow chart of an exemplary preliminary measurement subroutine.

In this subroutine, the aperture value Fs is determined as described above (S251 to S256). That is, the aperture 75 is opened (S251), and a slit light of minimum laser intensity is projected (S252), and a provisional aperture value is set based on the output of the sensor 53 at this time (S253). Then, a slit light is projected at maximum laser intensity (S254), and the process is sequentially repeated and the provisional aperture value changed until the output of the sensor 53 is within the permitted range (S255). When the output of the sensor 53 is within the permitted range (S255), the provisional aperture value Fs is set as the aperture value F used in measurement (S256).

Then, the change cycle of the background light is detected based on the output of the flicker detector 77 (S257). For example, the edge interval may be detected for the pulse output by the flicker detector. Since, normally, the background light change cycle is at commercial light source frequency (5%0 Hz), a process may be executed to determine any of a plurality of expected cycles.

Figure 22:
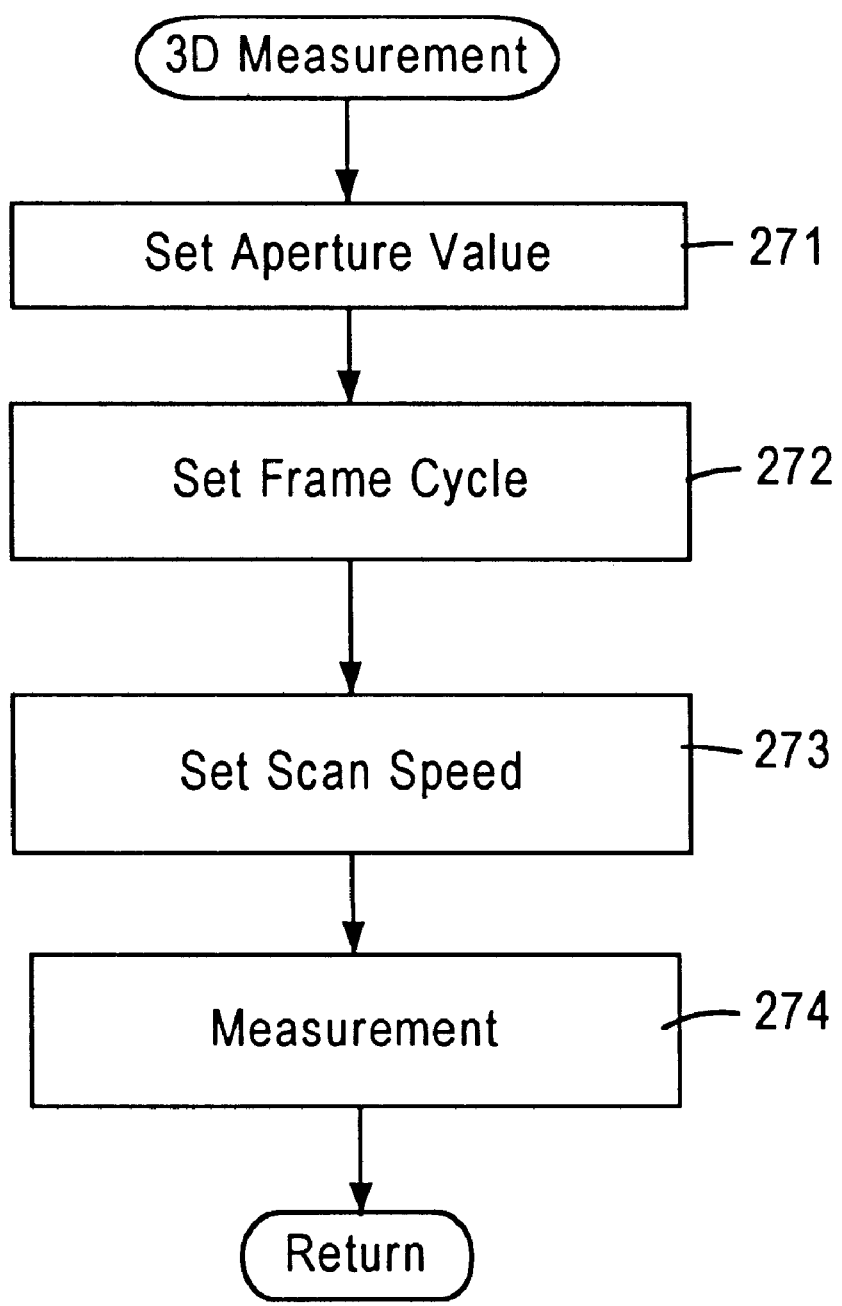
FIG. 22 is a flow chart of an exemplary three-dimensional measurement subroutine.

FIG. 22 is a flow chart of an exemplary three-dimensional measurement subroutine.

The aperture 75, frame cycle of the sensor 53, and scan speed (slight light U deflection speed) are set based on the information obtained in the preliminary measurement, and thereafter the measurement is accomplished (S271, S271, S273 and S274 respectively). In setting the aperture 75, the aperture value Fs determined by the preliminary measurement process is used, and the detection result of the background light change cycle is used in setting the frame cycle. The scan speed is faster when the frame cycle is shorter, and conversely the scan speed is slower when the frame cycle is longer.

According to the previously described embodiment, the passage time nop of the slit light U is not detected based on the peak timing of the photoreception, but rather is detected based on the center ip calculated by the center calculation within a predetermined period (a 32 line cycle in the present embodiment) upon entering the effective photoreception area Ae, such that the influence of noise is negligible. Furthermore, a peak detection circuit is unnecessary since the output of a predetermined period is used.

In the aforesaid embodiment, the actual time center Npeak can be calculated relative to an object Q within the measurable distance range d' because the predetermined period is 32 lines which encompasses the entirety of the effective photoreception area Ae. It is also possible to use a suitable interval before or after the photoreception peak, e.g., 15 lines, 10 lines, or 5 lines before or after the peak. In this case, when a predetermined period is set in linkage with a peak, there is minimal influence of light other than the stipulated detection light from the surface of the object Q.

Although the three-dimensional position is calculated based on data D62 in the aforesaid embodiment, it is to be noted that the three-dimensional position also may be calculated based on the data of the center ip determined by the center calculation circuit 73. Furthermore, although the calculation of the three-dimensional position is accomplished by the host 3, the camera 2 may also be provided with a calculation function for calculating the three-dimensional position. It is further possible to determine the three-dimensional position using a look up table method. In the reception side optical system 50, the image sensing magnification may be changed by an exchangeable lens substituted for the zoom lens 51. The construction of the three-dimensional camera 2, the host 3, and the measuring system 1 may be modified in part or entirety, the sequence and content of the processes, and the process timing may be variously modified insofar as such modification does not depart from the scope of the present invention.

According to the invention suitable exposure and depth of field are set for three-dimensional measurement and two-dimensional measurement, respectively, so as to improve the quality of the output image.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable other skilled in the art to best utilize the invention in various embodiments and with various modifications as are suited to the particular use contemplated. It is intended that the scope of the invention be defined by the claims appended hereto.

What is claimed is:

1. An image detection device comprising a projector which projects a reference light on an object;
   an image sensor which senses an image of the object and converts said image into electrical signals; and
   a controller for controlling said projector and said image sensor, wherein when said controller prevents said projector from projecting the reference light, said image sensor captures the image of the object for obtaining a two-dimensional image information of the object, and when said controller instructs said projector to project the reference light, said image sensor captures the image of the object for obtaining a three dimensional image information of the object;
   wherein said image sensor comprises:
   an aperture that restricts a passage of entering light into said image sensor; and
   an aperture controller for independently setting a first aperture value for the aperture when obtaining a two-dimensional image information and setting a second aperture value for the aperture when obtaining a three-dimensional image information.

2. The image detecting device of claim 1, further comprises a processing unit which measures a shape of the object based on the three dimensional image information.

3. The image detecting device of claim 1, wherein said image sensor further comprises;
   a first light receiving device for capturing the image of the object for obtaining the two-dimensional image information
   a second light receiving device for capturing the image of the object for obtaining the three-dimensional image information:
   a lens system which receives light from the object; and
   an optical member for distributing the light received by said lens system to said first light receiving device and said second light receiving device,
   wherein said aperture is disposed within the optical path between said lens system and said optical member.

4. The image detecting device of claim 3, wherein said lens system comprises a zooming and focusing mechanism for zooming and focusing said lens system.

5. The image detecting device of claim 2, wherein said second aperture value is set based on the intensity of the received reference light.

6. The image detecting device of claim 1, wherein said projector projects the reference light in the form of a slit, and said reference light scans the object so as to move one pixel pitch on a surface of said image sensor in a sampling cycle.

7. The image detecting device of claim 6, further comprising a processing unit which determines the time center Npeak by which an optical axis of the reference light passes through the object surface in a range encircling a target pixel of said image sensor.

8. The image detecting device of claim 7, wherein said processing unit determines the position of the object based on a relationship between an illumination direction of the reference light at the determined time center Npeak and an entrance direction of the reference light relative to the target pixel.

9. The image detecting device of claim 6, wherein said processing unit comprises:
   a memory for storing a plurality of frames of an image, each frame of said plurality of frames having a plurality of lines of an image with a line in common with all other frames of said plurality of frames, and
   wherein said processing unit determines a time center Npeak of said line in common with all other frames of said plurality of frames.

10. The image detecting device of claim 9, wherein said processing unit overwrites an area of said memory having the oldest frame with a new frame having another line in common with the remaining frames, and said processing unit repeats the determination of a time center Npeak for the another line in common with the remaining frames.

11. The image detecting device of claim 9, wherein said processing unit further comprises:
    a subtraction unit which subtracts an offset value from said line in common with all other frames;
    a first addition unit for determining a sum of photoreception data of a plurality of pixels and the sample number, as a first sum;
    a second addition unit for determining a sum of photoreception data of a plurality of pixels, as a second sum; and
    a dividing unit which determines a time center Npeak of a line by dividing the first sum by the second sum.

12. The image detecting device of claim 11, wherein said offset value is calculated based on photoreception data of a pixel when the reference light does not enter said image sensor.

13. The image detecting device of claim 11, wherein said offset value is predetermined fixed value.

14. The image detecting device of claim 11, wherein said offset value is calculated in real time by selecting the smallest average value of photoreception data of a plurality of adjacent pixels to a target pixel.

15. The image detecting device of claim 1, further comprising a flicker detector which detects a change frequency in light received by said image sensor, and
    wherein said controller controls said image sensor to sense frames of an image at a frequency which is a multiple of said detected change frequency.

16. The image detecting device of claim 1, further comprising a display unit which displays an image formed from the two-dimensional image information and the three-dimensional image information.

17. A method of detecting an image in an image detecting device including a projector which projects a reference light on an object, an image sensor which senses an image of the object, and a controller which controls the projector and the image sensor, the method comprising:
    a first sensing step of sensing the image of the object for obtaining a two-dimensional image information by said image sensor:
    a second sensing step of sensing the image of the object for obtaining a three dimensional image information based on the reference light; and
    a forming step of forming an image based on the two-dimensional information and the three-dimensional information,
    wherein said first sensing step comprises steps of:
    setting a first aperture value of an aperture so that a suitable amount of light passes through said aperture for obtaining the two-dimensional image information; and
    capturing the image of the object to obtain the two dimensional image information, and wherein said second sensing step comprises steps of:

setting a second aperture value of an aperture so that a suitable amount of light passes through said aperture for obtaining the three-dimensional image information; and capturing the image of the object to obtain the three-dimensional image information.

18. The method according to claim 17, further comprising a step of a preliminary measurement;

wherein said step of preliminary measurement occurs after said first sensing step and before said second sensing step.

19. The method according to claim 18, wherein said step of preliminary measurement further comprises steps of:

opening the aperture through which the the image of the object passes;

projecting a minimum intensity of the reference light by said projector:

setting a provisional aperture value based on a measured value of the light received through the aperture at the minimum intensity of the reference light;

projecting a maximum intensity of the reference light by said projector; and setting the provisional aperture value as the second aperture value if a measured value of the light received through the aperture at the maximum intensity of the reference light is within a predetermined range.

20. The method according to claim 19, wherein said step of preliminary measurement further comprises a step of:

repeating the steps of setting a provisional aperture value and projecting a reference light having a maximum intensity if a measured value of the light received through the aperture at the maximum intensity of the reference light is not within a predetermined range.

21. The method according to claim 18, wherein said step of preliminary measurement further comprises a step of:

detecting a change cycle of background light by a flicker detector.

22. An image detection device which is operable in both of a two-dimensional mode and three-dimensional mode, comprising:

an image sensing portion for capturing an image of the object to obtain a two-dimensional image information in the two-dimensional mode and obtain a three-dimensional image information in the three-dimensional mode;

an aperture for adjusting an amount of light entering said image sensing portion in accordance with an aperture value; and a controller for setting a first value as the aperture value in the two-dimensional mode and setting a second value as the aperture value in the three-dimensional mode, said first value being suitable for obtaining the two-dimensional image information and said second value being suitable for obtaining the three-dimensional image information.

23. The image detecting device of claim 22, further comprising a processing unit for calculating an information pertaining to a shape of the object based on the three-dimensional image obtained by said image sensing portion in the three-dimensional mode.

24. The image detecting device of claim 22, further comprising a lens system for projecting the image of the object onto the image sensing portion, wherein said aperture is disposed between the image sensing portion and the lens system.

25. The image detecting device of claim 22, wherein said image sensing portion includes a first image sensor for obtaining the two-dimensional image information and a second image sensor for obtaining three-dimensional image information.

26. The image detecting device of claim 25, further comprising:

a lens system for receiving light from the object and projecting the received light onto said image sensing portion; and an optical member for distributing the light received by said lens system to said first image sensor and said second image sensor, wherein said aperture is disposed on an optical path between said lens system and said optical member.

27. The Image detecting device of claim 22, further comprising a projector for projecting a reference light on the object, wherein, the three-dimensional mode, said image sensing portion captures the image of the object while said projector projects the reference light on the object, and in the two-dimensional mode, the said image sensing portion capture the image of the object while said projector does not project the reference light on the object.

28. The image detecting device of claim 22, wherein said controller determines said second value according an intensity of reference light which is reflected by the object and is received by the image sensing portion.

* * * * *